US010566821B2

United States Patent
Wang

(10) Patent No.: US 10,566,821 B2
(45) Date of Patent: Feb. 18, 2020

(54) ELECTRIC VEHICLE AND VEHICLE-MOUNTED CHARGER, AND METHOD FOR CONTROLLING THE SAME

(71) Applicant: BYD COMPANY LIMITED, Shenzhen (CN)

(72) Inventor: Xinghui Wang, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 70 days.

(21) Appl. No.: 16/061,999

(22) PCT Filed: Dec. 16, 2016

(86) PCT No.: PCT/CN2016/110287
§ 371 (c)(1),
(2) Date: Jun. 13, 2018

(87) PCT Pub. No.: WO2017/101848
PCT Pub. Date: Jun. 22, 2017

(65) Prior Publication Data
US 2018/0375366 A1    Dec. 27, 2018

(30) Foreign Application Priority Data
Dec. 18, 2015  (CN) .......................... 2015 1 0957031

(51) Int. Cl.
*H02J 7/02*    (2016.01)
*H02J 7/00*    (2006.01)
(Continued)

(52) U.S. Cl.
CPC .............. *H02J 7/022* (2013.01); *B60L 53/20* (2019.02); *H01M 10/44* (2013.01);
(Continued)

(58) Field of Classification Search
CPC ...... H02J 7/0052; H02J 7/022; H01M 10/617; H01M 10/625
(Continued)

(56) References Cited

U.S. PATENT DOCUMENTS 8,222,862 B2 *  7/2012  Ichikawa ................ B60L 58/20
                                                       320/116
8,423,218 B2 *  4/2013  Koide ....................... B60K 6/46
                                                       701/22
(Continued)

FOREIGN PATENT DOCUMENTS

CN    101362442 A    2/2009
CN    102437772 A    5/2012
(Continued)

OTHER PUBLICATIONS

The World Intellectual Property Organization (WIPO) International Search Report and Written Opinion for PCT/CN2016/110287 dated Mar. 28, 2017 8 Pages.

*Primary Examiner* — Alfonso Perez Borroto
(74) *Attorney, Agent, or Firm* — Anova Law Group, PLLC

(57) ABSTRACT

The present disclosure provides an electric vehicle, a vehicle-mounted charger and a method for controlling the same. The method includes: obtaining a first total charging time and a second total charging time in a second manner, and a first total discharging time and a second total discharging time in the second manner; calculating a first total working time in the first manner and a second total working time in the second manner; obtaining a first predetermined charging time in the first manner, a second predetermined charging time in the second manner, a first predetermined discharging time in the first manner and a second predetermined discharging time in the second manner; selecting a manner according to the first and second total working time;

(Continued)

and performing an alternate control according to the first and second predetermined charging time or according to the first and second predetermined discharging time.

20 Claims, 10 Drawing Sheets

(51) Int. Cl.
H01M 10/625 (2014.01)
H01M 10/44 (2006.01)
H01M 10/617 (2014.01)
B60L 53/20 (2019.01)
H02M 7/797 (2006.01)
H02M 7/219 (2006.01)
H02M 7/757 (2006.01)
H02M 7/5395 (2006.01)

(52) U.S. Cl.
CPC ....... H01M 10/617 (2015.04); H01M 10/625 (2015.04); H02J 7/0052 (2013.01); H02M 7/219 (2013.01); H02M 7/757 (2013.01); H02M 7/797 (2013.01); H01M 2220/20 (2013.01); H02J 2007/0059 (2013.01); H02M 7/5395 (2013.01); Y02T 10/7005 (2013.01); Y02T 10/7072 (2013.01); Y02T 10/92 (2013.01); Y02T 90/127 (2013.01); Y02T 90/14 (2013.01)

(58) Field of Classification Search
USPC .......................................................... 307/9.1
See application file for complete search history.

(56) References Cited

U.S. PATENT DOCUMENTS 9,304,969 B2 * 4/2016 Doi .......................... B60L 58/12
9,871,395 B2 * 1/2018 Yoshida .................... H02J 7/14

FOREIGN PATENT DOCUMENTS

| CN | 104600998 A | 5/2015 |
| CN | 204835609 U | 12/2015 |
| KR | 101533630 B1 | 7/2015 |

* cited by examiner

ELECTRIC VEHICLE AND VEHICLE-MOUNTED CHARGER, AND METHOD FOR CONTROLLING THE SAME

CROSS-REFERENCE TO RELATED APPLICATION

The present application is a national phase entry under 35 U.S.C. § 371 of International Application No. PCT/CN2016/110287, filed on Dec. 16, 2016, which is based on and claims priority to Chinese Patent Application Serial No. 201510957031.0 filed on Dec. 18, 2015, all content of all of which is hereby incorporated by reference in its entity.

FIELD

The present disclosure relates to the technical field of electric vehicles and, in particular, to a method for controlling a vehicle-mounted charger of an electric vehicle, a vehicle-mounted charger of an electric vehicle, and an electric vehicle.

BACKGROUND

Along with the commercialization progress of electric vehicles, a vehicle-mounted charger of the electric vehicles has become one of important components in the electric vehicles.

There are many methods for charging the whole vehicle and for outwardly discharging from the whole vehicle via the vehicle-mounted charger. A monophase H bridge control method is mostly adopted in related arts, which includes a dual-polarity control method and a mono-polarity control method.

However, when the dual-polarity control method is adopted, four switch transistors in an H bridge are all in a high frequency ON/OFF state, resulting in higher switching loss and larger heat loss. When the mono-polarity control method is adopted, although the heat loss of the switch transistors that is generated when the dual-polarity control method is adopted can be solved to some extent, the four switch transistors in the H bridge are controlled according to a fixed manner during a charging process or a discharging process of the whole vehicle, some switch transistors in the H bridge need to be switched off with current. The overheat problems of the switch transistors switched off with current are not effectively solved.

Therefore, regardless of whether the dual-polarity control method or the mono-polarity control method is adopted, the heating problems of the switch transistors in the H bridge cannot be effectively solved, and the service life of the switch transistors is affected.

SUMMARY

The present disclosure aims to solve at least one of the technical problems in the related art to some extent. For this purpose, a first objective of the present disclosure is to provide a method for controlling a vehicle-mounted charger of an electric vehicle, which is capable of enabling heating of a first switch transistor, a second switch transistor, a third switch transistor and a fourth switch transistor in an H bridge to be relatively balanced, and improving a service life of the switch transistors in the H bridge.

A second objective of the present disclosure is to provide a vehicle-mounted charger of an electric vehicle. A third objective of the present disclosure is to provide an electric vehicle.

For the above purposes, in one aspect of embodiments of the present disclosure, there is provided a method for controlling a vehicle-mounted charger of an electric vehicle. The vehicle-mounted charger includes an H bridge. The H bridge includes a first switch transistor, a second switch transistor, a third switch transistor and a fourth switch transistor. The method includes: obtaining a first total charging time for controlling the H bridge in a first manner, a second total charging time for controlling the H bridge in a second manner, a first total discharging time for controlling the H bridge in the first manner and a second total discharging time for controlling the H bridge in the second manner; calculating a first total working time of the H bridge in the first manner according to the first total charging time and the first total discharging time, and calculating a second total working time of the H bridge in the second manner according to the second total charging time and the second total discharging time; obtaining a first predetermined charging time for controlling the H bridge in the first manner, a second predetermined charging time for controlling the H bridge in the second manner, a first predetermined discharging time for controlling the H bridge in the first manner and a second predetermined discharging time for controlling the H bridge in the second manner; selecting a manner according to a relation between the first total working time and the second total working time; and performing an alternate control on the H bridge according to the first predetermined charging time and the second predetermined charging time if the vehicle-mounted charger charges the power battery, or according to the first predetermined discharging time and the second predetermined discharging time if the power battery discharges via the vehicle-mounted charger, in which the first predetermined charging time and the second predetermined charging time are preset for each charging cycle of a charging process of the power battery, and the first predetermined discharging time and the second predetermined discharging time are preset for each discharging cycle of a discharging process of the power battery.

According to the method for controlling a vehicle-mounted charger of an electric vehicle in embodiments of the present disclosure, the first total working time of the H bridge in the first manner is calculated according to the obtained first total charging time and the obtained first total discharging time, and the second total working time of the H bridge in the second manner is calculated according to the obtained second total charging time and the obtained second total discharging time, and then the manner for controlling the H bridge is selected according to the relation between the first total working time and the second total working time; and then the alternate control is performed on the H bridge according to the first predetermined charging time and the second predetermined charging time when the vehicle-mounted charger charges the power battery, or the alternate control is performed on the H bridge according to the first predetermined discharging time and the second predetermined discharging time when the power battery outwardly discharges via the vehicle-mounted charger, so as to perform a temperature balanced control over the first switch transistor, the second switch transistor, the third switch transistor and the fourth switch transistor, such that the heating of each switch transistor is relatively balanced, the service life of the switch transistors in the H bridge is prolonged, and thus the service time is prolonged.

For the above purposes, in another aspect of embodiments of the present disclosure, there is provided a vehicle-mounted charger of an electric vehicle, including: an H bridge, including a first switch transistor, a second switch transistor, a third switch transistor and a fourth switch transistor; and a controller, configured to obtain a first total charging time for controlling the H bridge in a first manner, a second total charging time for controlling the H bridge in a second manner, a first total discharging time for controlling the H bridge in the first manner and a second total discharging time for controlling the H bridge in the second manner; to calculate a first total working time of the H bridge in the first manner according to the first total charging time and the first total discharging time and to calculate a second total working time of the H bridge in the second manner according to the second total charging time and the second total discharging time; to obtain a first predetermined charging time for controlling the H bridge in the first manner, a second predetermined charging time for controlling the H bridge in the second manner, a first predetermined discharging time for controlling the H bridge in the first manner and a second predetermined discharging time for controlling the H bridge in the second manner; to select a manner for controlling the H bridge according to a relation between the first total working time and the second total working time; and to perform an alternate control on the H bridge according to the first predetermined charging time and the second predetermined charging time if the vehicle-mounted charger charges the power battery or according to the first predetermined discharging time and the second predetermined discharging time if the power battery discharges via the vehicle-mounted charger, in which the first predetermined charging time and the second predetermined charging time are preset for each charging cycle of a charging process of the power battery, and the first predetermined discharging time and the second predetermined discharging time are preset for each discharging cycle of a discharging process of the power battery.

According to the vehicle-mounted charger of an electric vehicle in embodiments of the present disclosure, the controller calculates the first total working time of the H bridge in the first manner according to the obtained first total charging time and the obtained first total discharging time, and the second total working time of the H bridge in the second manner according to the obtained second total charging time and the obtained second total discharging time, and then selects the manner of controlling the H bridge according to the relation between the first total working time and the second total working time; and then performs the alternate control on the H bridge according to the first predetermined charging time and the second predetermined charging time when the vehicle-mounted charger charges the power battery, or performs the alternate control on the H bridge according to the first predetermined discharging time and the second predetermined discharging time when the power battery discharges via the vehicle-mounted charger, so as to perform a temperature balanced control over the first switch transistor, the second switch transistor, the third switch transistor and the fourth switch transistor, such that the heating of each switch transistor is relatively balanced, the service life of the switch transistors in the H bridge is prolonged, and thus the service time is prolonged.

In addition, an embodiment of the present disclosure also provides an electric vehicle, including the vehicle-mounted charger of an electric vehicle.

According to the electric vehicle in embodiments of the present disclosure, when the power battery is charged and discharged by the above vehicle-mounted charger, the temperature balanced control over the first switch transistor, the second switch transistor, the third switch transistor and the fourth switch transistor in the H bridge can be realized, such that the heating of each switch transistor is balanced, the service life of the switch transistors in the H bridge is prolonged, and thus the service time of the vehicle-mounted charger is prolonged.

DETAILED DESCRIPTION

Figure 1:
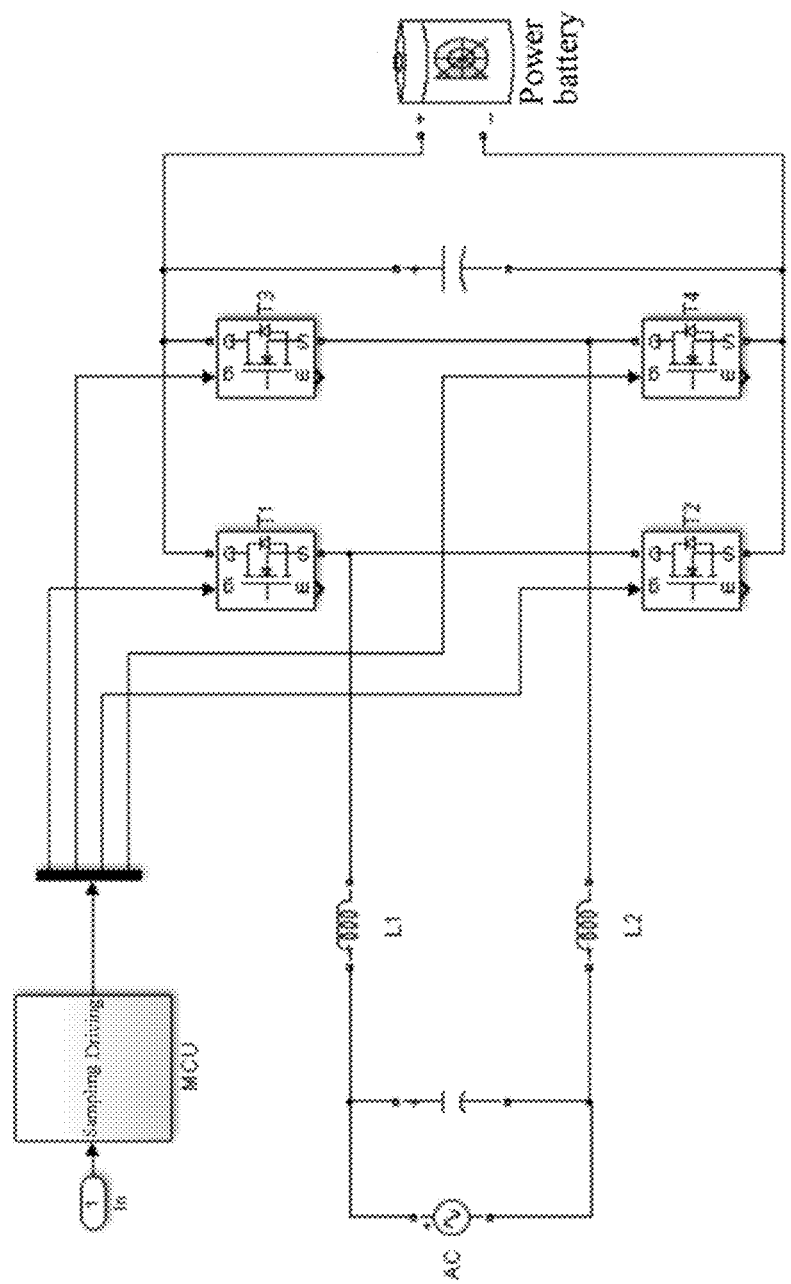
FIG. 1 is a circuit schematic diagram of a vehicle-mounted charger of an electric vehicle according to an embodiment of the present disclosure.

The embodiments of the present disclosure are described in detail, examples of the embodiments are shown in the drawings, wherein, the same or similar numbers represent same or similar elements or elements having the same or similar functions from beginning to end. The embodiments described with reference to the drawings are exemplary, and aim to explain the present disclosure rather than understood as a limitation to the present disclosure.

The method for controlling a vehicle-mounted charger of an electric vehicle, a vehicle-mounted charger of an electric vehicle, and an electric vehicle with the vehicle-mounted charger, provided according to embodiments of the present disclosure, are described with reference to the drawings as follows.

Figure 2:
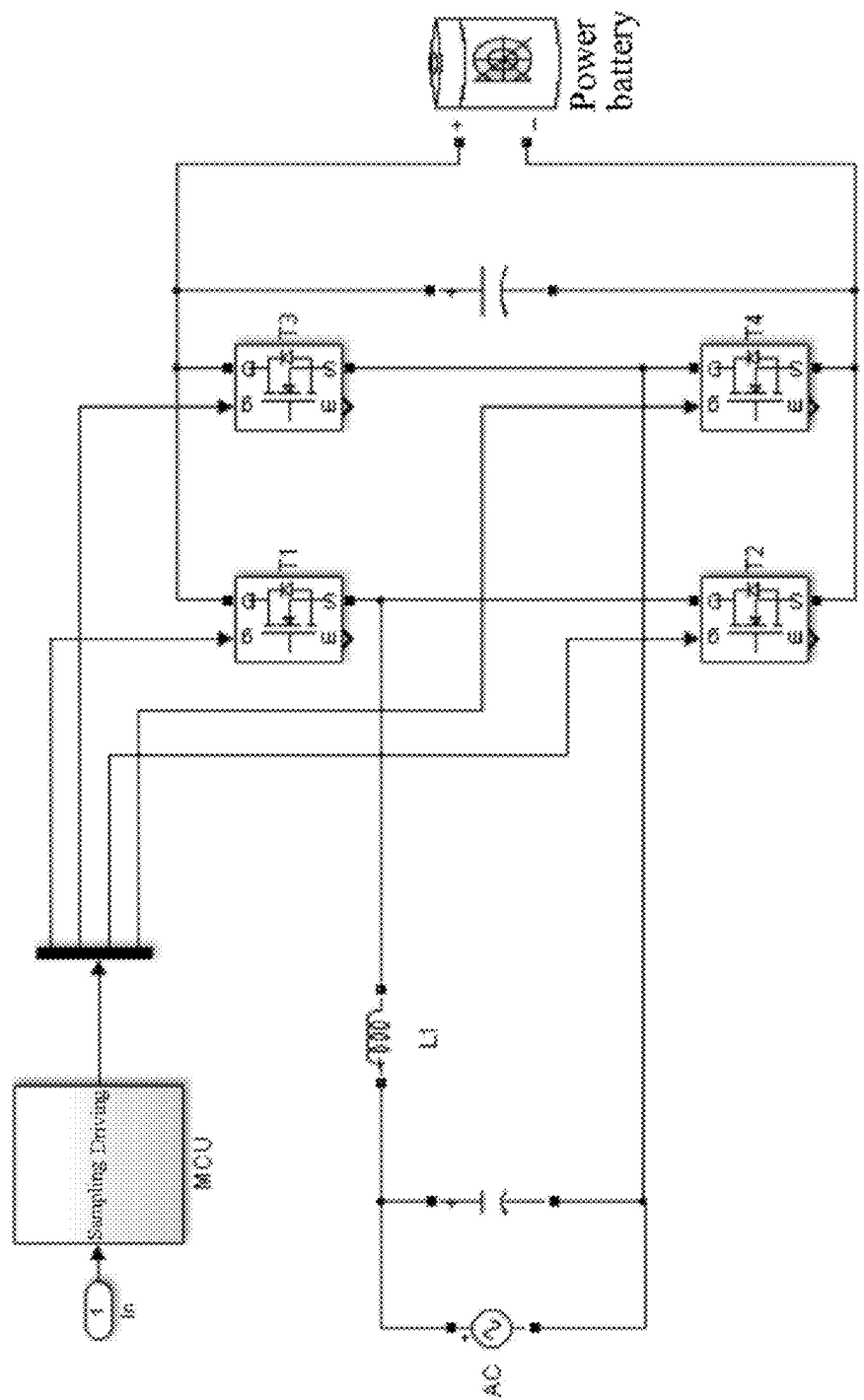
FIG. 2 is a circuit schematic diagram of a vehicle-mounted charger of an electric vehicle according to another embodiment of the present disclosure.
Figure 3:
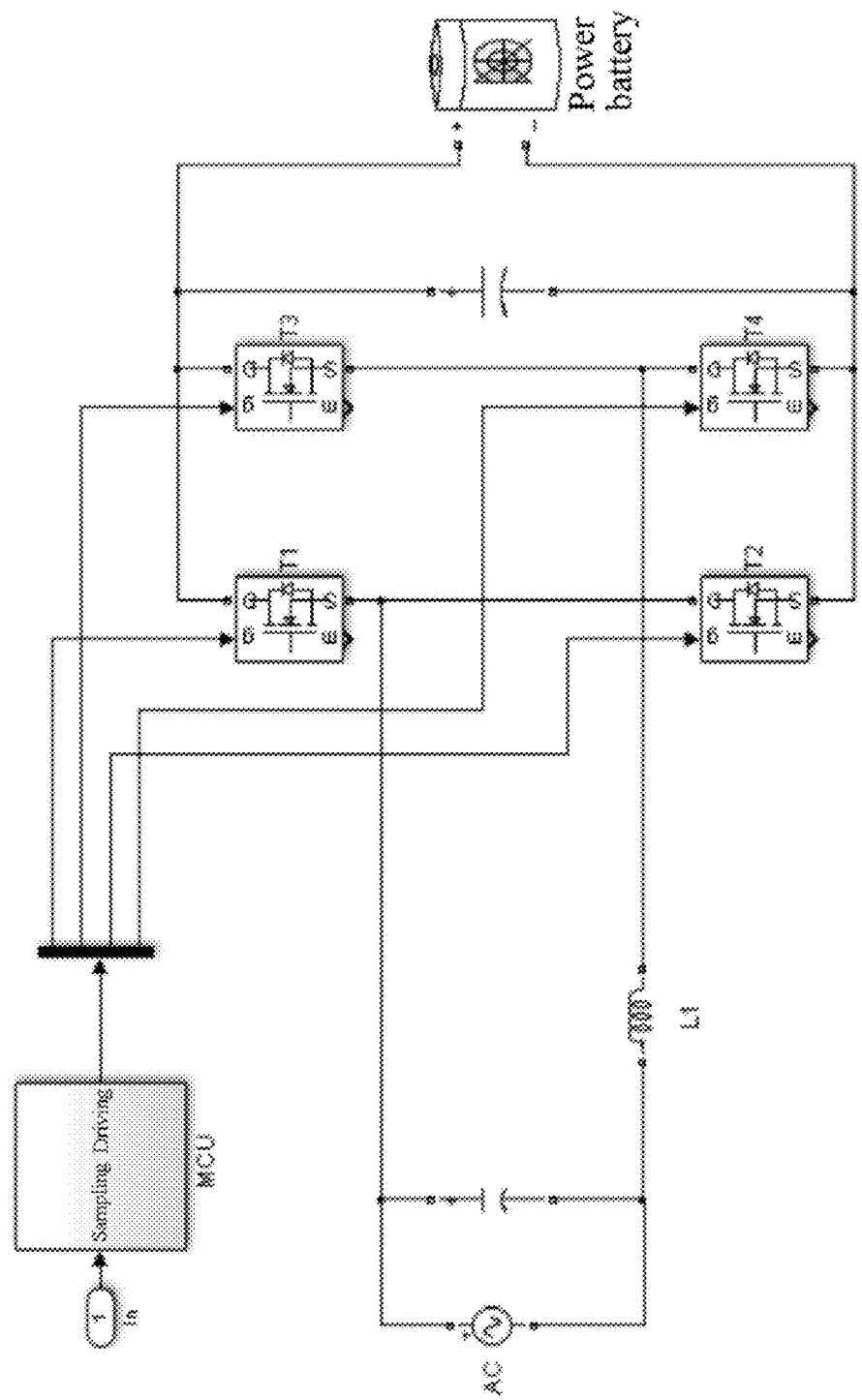
FIG. 3 is a circuit schematic diagram of a vehicle-mounted charger of an electric vehicle according to another embodiment of the present disclosure.

FIGS. 1 to 3 show a connecting manner of a vehicle-mounted charger of an electric vehicle according to an embodiment of the present disclosure. As shown in FIGS. 1 to 3, the vehicle-mounted charger of an electric vehicle according to embodiments of the present disclosure includes an H bridge. The H bridge includes a first switch transistor T1, a second switch transistor T2, a third switch transistor T3 and a fourth switch transistor T4. The vehicle-mounted charger of an electric vehicle as shown in FIG. 1 includes a first inductor L1 and a second inductor L2, in which a first end of the first inductor L1 is connected to one end of a load or an anode end of an alternating current power grid AC, and a first end of the second inductor L2 is connected to the other end of the load or a cathode end of the alternating current power grid AC, and a second end of the first inductor L1 and a second end of the second inductor L2 are connected to the H bridge. The vehicle-mounted charger of an electric vehicle as shown in FIG. 2 merely includes an inductor, for example, the inductor L1, in which a first end of the first inductor L1 is connected to one end of a load or an anode end of an alternating current power grid AC, and a second end of the first inductor L1 is connected to the H bridge. The vehicle-mounted charger of an electric vehicle as shown in FIG. 3 merely includes an inductor, for example, the first inductor L1, in which a first end of the first inductor L1 is connected to the other end of the load or a cathode end of the alternating current power grid AC, and a second end of the first inductor L1 is connected to the H bridge.

Figure 4:
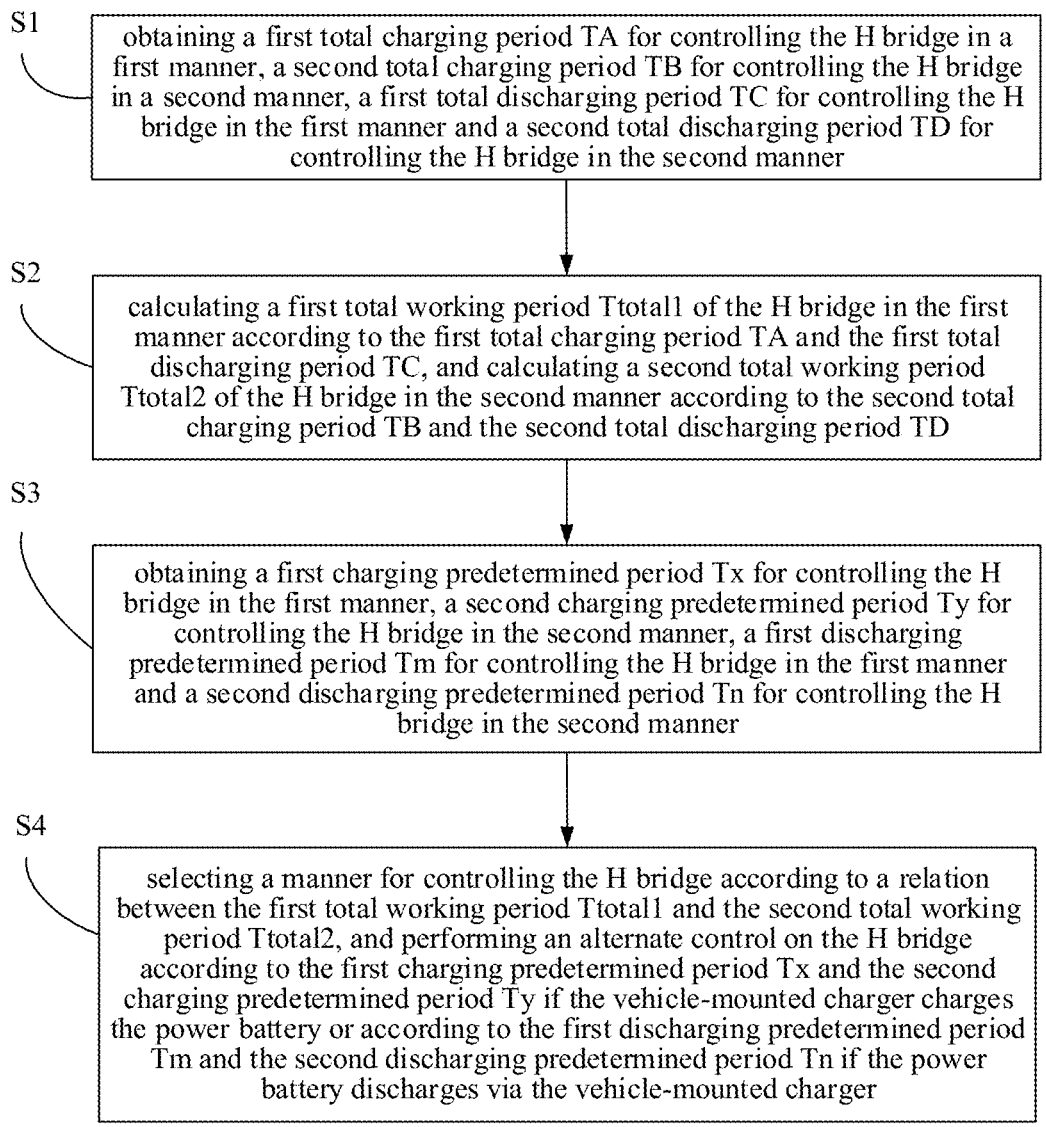
FIG. 4 is a flow chart of a method for controlling a vehicle-mounted charger of an electric vehicle according to an embodiment of the present disclosure.

FIG. 4 is a flow chart of a method for controlling a vehicle-mounted charger of an electric vehicle according to an embodiment of the present disclosure. As shown in FIG. 4, the method for controlling a vehicle-mounted charger of an electric vehicle according to an embodiment of the present disclosure includes followings.

At step S1, when the vehicle-mounted charger charges a power battery of the electric vehicle or when the power battery discharges via the vehicle-mounted charger, a first total charging time TA for controlling the H bridge in a first manner and a second total charging time TB for controlling the H bridge in a second manner, a first total discharging time TC for controlling the H bridge in the first manner and a second total discharging time TD for controlling the H bridge in the second manner are obtained.

Figure 5:
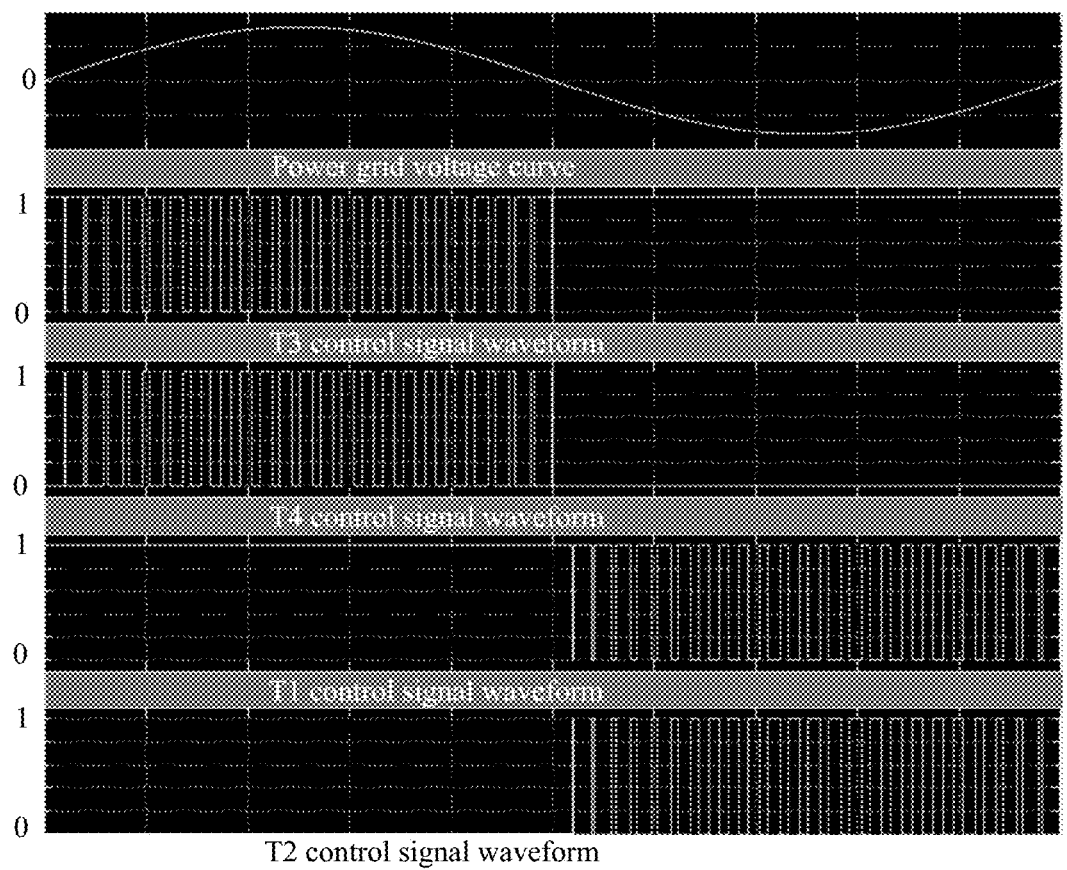
FIG. 5 is a schematic diagram of a control waveform of four switch transistors when an H bridge is controlled by using a first manner to charge a power battery according to an embodiment of the present disclosure.

According to an embodiment of the present disclosure, as shown in FIG. 5, if the H bridge is controlled in the first manner A to charge a power battery, and when a power grid transient voltage value of the vehicle-mounted charger is larger than 0, the first switch transistor T1 is controlled to be ON, the second switch transistor T2 is controlled to be OFF, and the third switch transistor T3 and the fourth switch transistor T4 are controlled to be ON and OFF complementarily and alternately. When the third switch transistor T3 and the fourth switch transistor T4 are controlled to be ON and OFF alternately and complementarily, the PWM waveform of the third switch transistor T3 and the PWM waveform of the fourth switch transistor T4 are controlled to be complementary with each other, and a duty ratio of the PWM waveform of the third switch transistor T3 is controlled from large to small and then to large, and a duty ratio of the PWM waveform of the fourth switch transistor T4 is controlled from small to large and then to small. When the power grid transient voltage value of the vehicle-mounted charger is smaller than 0, the third switch transistor T3 is controlled to be ON, the fourth switch transistor T4 is controlled to be OFF, and the first switch transistor T1 and the second switch transistor T2 are controlled to be ON and OFF complementarily and alternately. When the first switch transistor T1 and the second switch transistor T2 are controlled to be ON and OFF alternately and complementarily, the PWM waveform of the first switch transistor T1 and the PWM waveform of the second switch transistor T2 are controlled to be complementary with each other, and a duty ratio of the PWM waveform of the first switch transistor T1 is controlled from large to small and then to large, and a duty ratio of the PWM waveform of the second switch transistor T2 is controlled from small to large and then to small.

Figure 6:
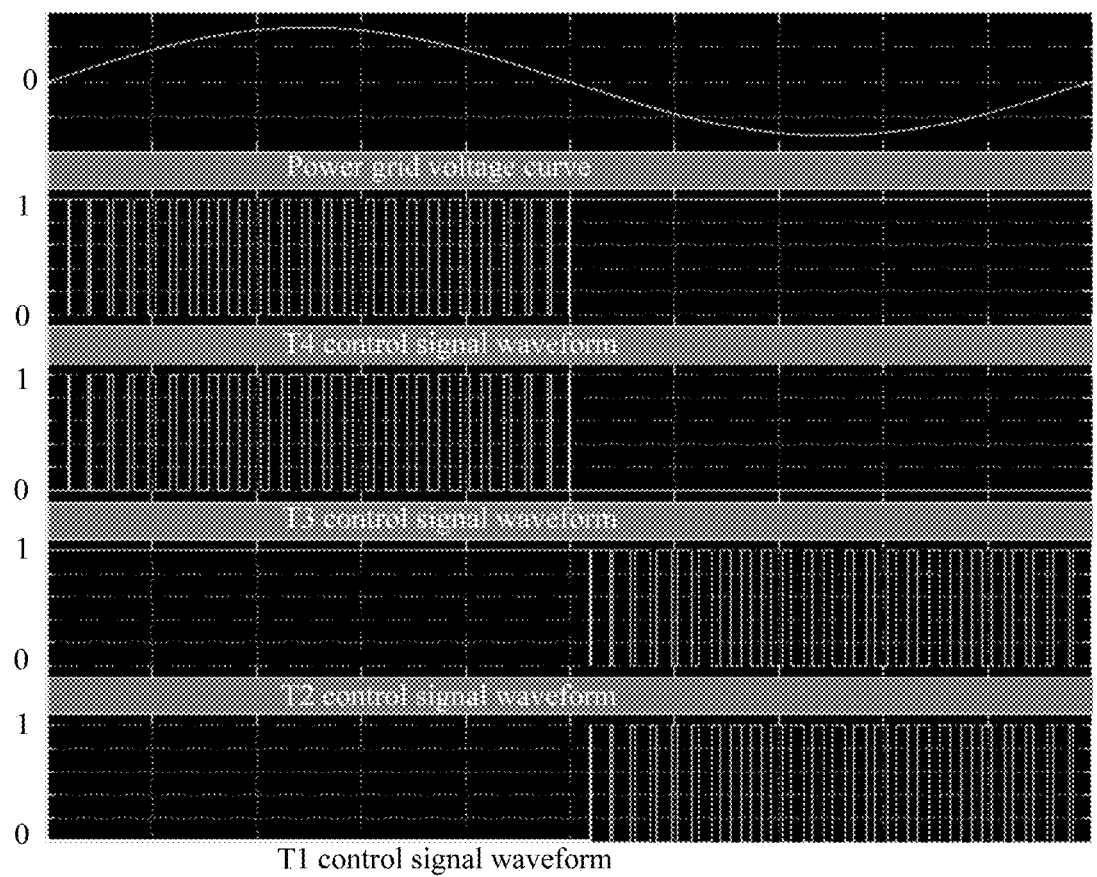
FIG. 6 is a schematic diagram of a control waveform of four switch transistors when an H bridge is controlled by using a second manner to charge a power battery according to an embodiment of the present disclosure.

According to an embodiment of the present disclosure, as shown in FIG. 6, if the H bridge is controlled in the second manner B to charge a power battery, and when a power grid transient voltage value of the vehicle-mounted charger is larger than 0, the second switch transistor T2 is controlled to be ON, the first switch transistor T1 is controlled to be OFF, and the third switch transistor T3 and the fourth switch transistor T4 are controlled to be ON and OFF complementarily and alternately. When the third switch transistor T3 and the fourth switch transistor T4 are controlled to be ON and OFF alternately and complementarily, the PWM waveform of the third switch transistor T3 and the PWM waveform of the fourth switch transistor T4 are controlled to be complementary with each other, and a duty ratio of the PWM waveform of the third switch transistor T3 is controlled from small to large and then to small, and a duty ratio of the PWM waveform of the fourth switch transistor T4 is controlled from large to small and then to large. When the power grid transient voltage value of the vehicle-mounted charger is smaller than 0, the fourth switch transistor T4 is controlled to be ON, the third switch transistor T3 is controlled to be OFF, and the first switch transistor T1 and the second switch transistor T2 are controlled to be ON and OFF complementarily and alternately. When the first switch transistor T1 and the second switch transistor T2 are controlled to be ON and OFF alternately and complementarily, the PWM waveform of the first switch transistor T1 and the PWM waveform of the second switch transistor T2 are controlled to be complementary with each other, and a duty ratio of the PWM waveform of the first switch transistor T1 is controlled from small to large and then to small, and a duty ratio of the PWM waveform of the second switch transistor T2 is controlled from large to small and then to large.

Figure 7:
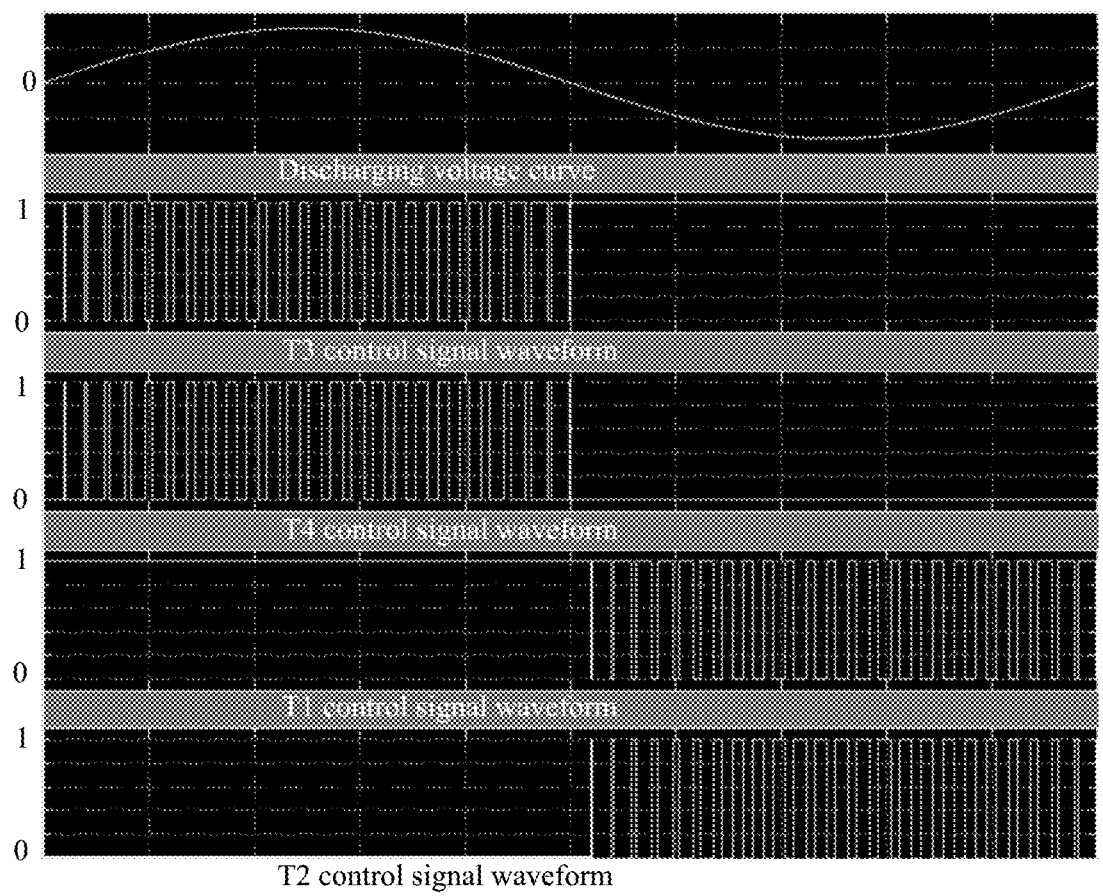
FIG. 7 is a schematic diagram of a control waveform of four switch transistors when an H bridge is controlled by using a first manner to enable a power battery to outwardly discharge according to an embodiment of the present disclosure.

According to an embodiment of the present disclosure, as shown in FIG. 7, if the H bridge is controlled in the first manner A to enable a power battery outwardly discharge, and when an outwardly discharging transient voltage value of the vehicle-mounted charger is larger than 0, the first switch transistor T1 is controlled to be ON, the second switch transistor T2 is controlled to be OFF, and the third switch transistor T3 and the fourth switch transistor T4 are controlled to be ON and OFF complementarily and alternately. When the third switch transistor T3 and the fourth switch transistor T4 are controlled to be ON and OFF alternately and complementarily, the PWM waveform of the third switch transistor T3 and the PWM waveform of the fourth switch transistor T4 are controlled to be complementary with each other, and a duty ratio of the PWM waveform of the third switch transistor T3 is controlled from large to small and then to large, and a duty ratio of the PWM waveform of the fourth switch transistor T4 is controlled from small to large and then to small. When the outwardly discharging transient voltage value of the vehicle-mounted charger is smaller than 0, the third switch transistor T3 is controlled to be ON, the fourth switch transistor T4 is controlled to be OFF, and the first switch transistor T1 and the second switch transistor T2 are controlled to be ON and OFF complementarily and alternately. When the first switch transistor T1 and the second switch transistor T2 are controlled to be ON and OFF alternately and complementarily, the PWM waveform of the first switch transistor T1 and the PWM waveform of the second switch transistor T2 are controlled to be complementary with each other, and a duty ratio of the PWM waveform of the first switch transistor T1 is controlled from large to small and then to large, and a duty ratio of the PWM waveform of the second switch transistor T2 is controlled from small to large and then to small.

Figure 8:
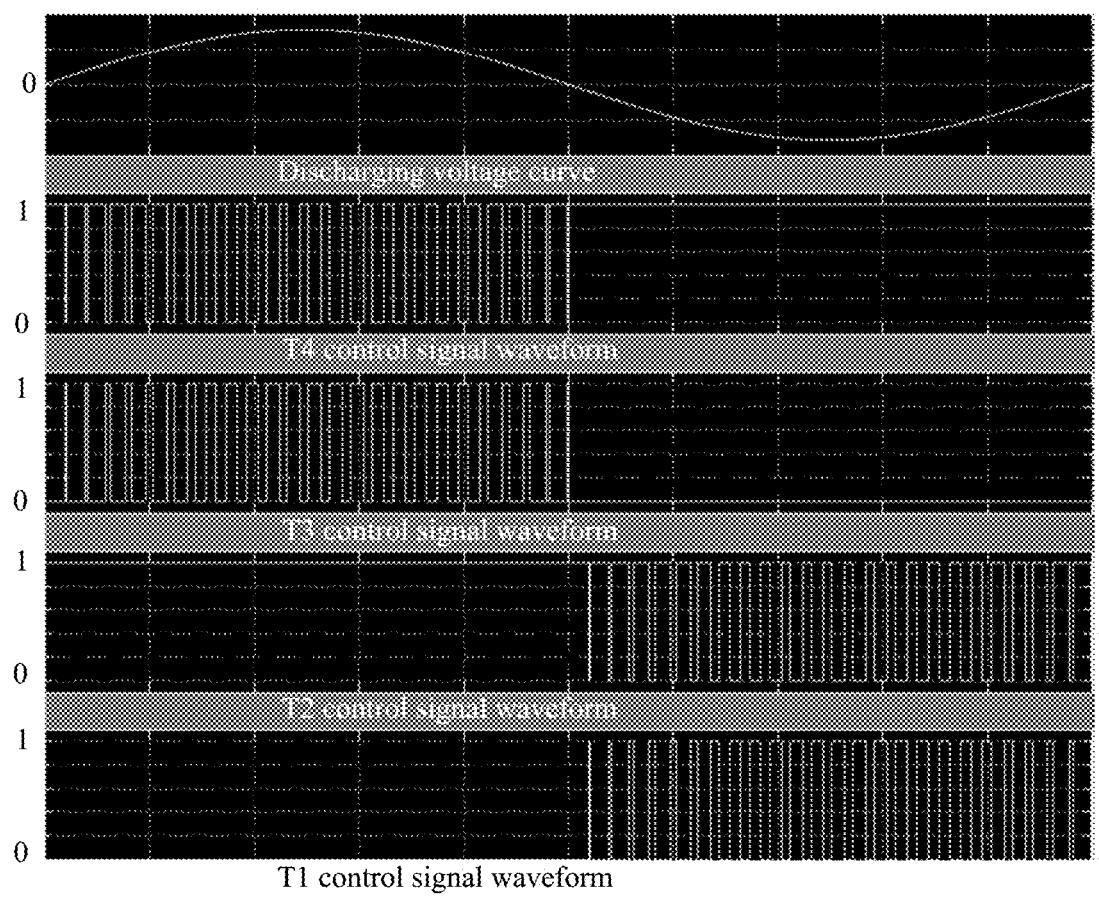
FIG. 8 is a schematic diagram of a control waveform of four switch transistors when an H bridge is controlled by using a second manner to enable a power battery to outwardly discharge according to an embodiment of the present disclosure.

According to an embodiment of the present disclosure, as shown in FIG. 8, if the H bridge is controlled in the second manner B to enable a power battery discharge outwardly, and when an outwardly discharging transient voltage value of the vehicle-mounted charger is larger than 0, the second switch transistor T2 is controlled to be ON, the first switch transistor T1 is controlled to be OFF, and the third switch transistor T3 and the fourth switch transistor T4 are controlled to be ON and OFF complementarily and alternately. When the third switch transistor T3 and the fourth switch transistor T4 are controlled to be ON and OFF alternately and complementarily, the PWM waveform of the third switch transistor T3 and the PWM waveform of the fourth switch transistor T4 are controlled to be complementary with each other, and a duty ratio of the PWM waveform of the third switch transistor T3 is controlled from small to large and then to small, and a duty ratio of the PWM waveform of the fourth switch transistor T4 is controlled from large to small and then to large. When the outwardly discharging transient voltage value of the vehicle-mounted charger is smaller than 0, the fourth switch transistor T4 is controlled to be ON, the third switch transistor T3 is controlled to be OFF, and the first switch transistor T1 and the second switch transistor T2 are controlled to be ON and OFF complementarily and alternately. When the first switch transistor T1 and the second switch transistor T2 are controlled to be ON and OFF alternately and complementarily, the PWM waveform of the first switch transistor T1 and the PWM waveform of the second switch transistor T2 are controlled to be complementary with each other, and a duty ratio of the PWM waveform of the first switch transistor T1 is controlled from small to large and then to small, and a duty ratio of the PWM waveform of the second switch transistor T2 is controlled from large to small and then to large.

At step S2, a first total working time $T_{total1}$ of the H bridge in the first manner is calculated according to the first total charging time TA and the first total discharging time TC, and a second total working time $T_{total2}$ of the H bridge in the second manner is calculated according to the second total charging time TB and the second total discharging time TD.

At step S3, a first predetermined charging time Tx for controlling the H bridge in the first manner, a second predetermined charging time Ty for controlling the H bridge in the second manner, a first predetermined discharging time Tm for controlling the H bridge in the first manner and a second predetermined discharging time Tn for controlling the H bridge in the second manner are obtained.

At step S4, a manner for controlling the H bridge is selected according to the relation between the first total working time $T_{total1}$ and the second total working time $T_{total2}$, and an alternate control is performed on the H bridge according to the first predetermined charging time Tx and the second predetermined charging time Ty if the vehicle-mounted charger charges the power battery or according to the first predetermined discharging time Tm and the second predetermined discharging time Tn if the power battery discharges via the vehicle-mounted charger, so as to perform a temperature balanced control over the first switch transistor, the second switch transistor, the third switch transistor and the fourth switch transistor.

In an embodiment of the present disclosure, S4 includes: selecting the manner from the first manner and the second manner for controlling the H bridge according to the relation between the first total working time $T_{total1}$ and the second total working time $T_{total2}$; and controlling the H bridge in the selected manner, until the first total working time $T_{total1}$ is equal to the second total working time $T_{total2}$.

In an embodiment of the present disclosure, the first predetermined charging time Tx and the second predetermined charging time Ty are preset for each charging cycle of a charging process of the power battery, and the first predetermined discharging time Tm and the second predetermined discharging time Tn are preset for each discharging cycle of a discharging process of the power battery.

In the process of charging the power battery by the vehicle-mounted charger, if the H bridge is only controlled by using the first manner A, when the power grid transient voltage value is larger than 0, the first switch transistor T1 is always kept ON, the second switch transistor T2 is always kept OFF, and the third switch transistor T3 and fourth switch transistor T4 are ON and OFF alternately and complementarily, and the inductor in the vehicle-mounted charger is charged when the third switch transistor T3 is ON and the fourth switch transistor T4 is OFF, and discharges when the third switch transistor T3 is OFF and the fourth switch transistor T4 is ON; when the power grid transient voltage value is smaller than 0, the third switch transistor T3 is always kept ON, the fourth switch transistor T4 is always kept OFF, and the first switch transistor T1 and second switch transistor T2 are ON and OFF alternately and complementarily, and the inductor in the vehicle-mounted charger is charged when the first switch transistor T1 is ON and the second switch transistor T2 is OFF, and discharges when the first switch transistor T1 is OFF and the second switch transistor T2 is ON. Since the inductor is charged when the first switch transistor T1 and the third switch transistor T3 are ON, the open duty ratio is larger, therefore, the first switch transistor T1 and the third switch transistor T3 are overheated.

Similarly, in the process of charging the power battery by the vehicle-mounted charger, if the H bridge is only controlled by using the second manner B, when the power grid transient voltage value is larger than 0, the first switch transistor T1 is always kept OFF, the second switch transistor T2 is always kept ON, and the third switch transistor T3 and fourth switch transistor T4 are ON and OFF alternately and complementarily, and the inductor in the vehicle-mounted charger is charged when the fourth switch transistor T4 is ON and the third switch transistor T3 is OFF, and discharges when the fourth switch transistor T4 is OFF and the third switch transistor T3 is ON; when the power grid transient voltage value is smaller than 0, the fourth switch transistor T4 is always kept ON, the third switch transistor T3 is always kept OFF, and the first switch transistor T1 and second switch transistor T2 are ON and OFF alternately and complementarily, and the inductor in the vehicle-mounted charger is charged when the second switch transistor T2 is ON and the first switch transistor T1 is OFF, and discharges when the second switch transistor T2 is OFF and the first switch transistor T1 is ON. Since the inductor is charged when the second tube T2 and the fourth tube T4 are ON, the open duty ratio is larger, therefore, the second switch transistor T2 and the fourth switch transistor T4 are overheated.

In the process of discharging from the power battery via the vehicle-mounted charger, if the H bridge is only controlled by using the first manner A, when the outwardly discharging transient voltage value is larger than 0, the first switch transistor T1 is always kept ON, the second switch transistor T2 is always kept OFF, and the third switch transistor T3 and fourth switch transistor T4 are alternately and complementarily ON and OFF, and the inductor in the vehicle-mounted charger is charged when the third switch transistor T3 is OFF and the fourth switch transistor T4 is ON, and discharges when the third switch transistor T3 is ON and the fourth switch transistor T4 is OFF; when the outwardly discharging transient voltage value is smaller than 0, the third switch transistor T3 is always kept ON, the fourth switch transistor T4 is always kept OFF, and the first switch transistor T1 and second switch transistor T2 are alternately and complementarily ON and OFF, and the inductor in the vehicle-mounted charger is charged when the first switch transistor T1 is OFF and the second switch transistor T2 is ON, and discharges when the first switch transistor T1 is ON and the second switch transistor T2 is OFF. Since the inductor is charged when the second switch transistor T2 and the fourth switch transistor T4 are ON, the second switch transistor T2 and the fourth switch transistor T4 are OFF with current, and hard switching is performed, therefore, the second switch transistor T2 and the fourth switch transistor T4 are overheated.

Similarly, in the process of discharging from the power battery via the vehicle-mounted charger, if the H bridge is only controlled by using the second manner B, when the outwardly discharging transient voltage value is larger than 0, the first switch transistor T1 is always kept OFF, the second switch transistor T2 is always kept ON, and the third switch transistor T3 and fourth switch transistor T4 are alternately and complementarily ON and OFF, and the inductor in the vehicle-mounted charger is charged when the fourth switch transistor T4 is OFF and the third switch transistor T3 is ON, and discharges when the fourth switch transistor T4 is ON and the third switch transistor T3 is OFF; when the outwardly discharging transient voltage value is smaller than 0, the fourth switch transistor T4 is always kept ON, the third switch transistor T3 is always kept OFF, and the first switch transistor T1 and second switch transistor T2 are alternately and complementarily ON and OFF, and the inductor in the vehicle-mounted charger is charged when the second switch transistor T2 is OFF and the first switch transistor T1 is ON, and discharges when the second switch transistor T2 is ON and the first switch transistor T1 is OFF. Since the inductor is charged when the first switch transistor T1 and the third switch transistor T3 are ON, the first switch transistor T1 and the third switch transistor T3 are OFF with current, and hard switching is performed, therefore, the first switch transistor T1 and the third switch transistor T3 are overheated.

Therefore, in an embodiment of the present disclosure, the H bridge is controlled by using the first manner A, such that when the vehicle-mounted charger charges the power battery, the time that the H bridge is controlled in the first manner A is recorded, thus the first total charging time TA for controlling the H bridge in the first manner is obtained, and then is stored; the H bridge is controlled by using the first manner A, such that when the power battery outwardly discharges via the vehicle-mounted charger, the time that the H bridge is controlled in the first manner A is recorded, thus the first total discharging time TC for controlling the H bridge in the first manner is obtained, and then is stored; the H bridge is controlled by using the second manner B, such that when the vehicle-mounted charger charges the power battery, the time that the H bridge is controlled by the second manner B is recorded, thus the second total charging time TB for controlling the H bridge in the second manner is obtained, and then is stored; the H bridge is controlled by using the second manner B, such that when the power battery outwardly discharges via the vehicle-mounted charger, the time that the H bridge is controlled by the second manner B is recorded, thus the second total discharging time TD for controlling the H bridge in the second manner is obtained, and then is stored. Then, the first total working time $T_{total1}$ that the H bridge is controlled in the first manner A to charge the power battery and to enable the power battery to outwardly discharge is calculated, the second total working time $T_{total2}$ that the H bridge is controlled in the second manner B to charge the power battery and to enable the power battery to outwardly discharge is calculated, and the relation between the first total working time $T_{total1}$ and the second total working time $T_{total2}$ is determined. Finally, the manner of controlling the H bridge is selected according to the relation between the first total working time $T_{total1}$ and the second total working time $T_{total2}$, thereby realizing the temperature balanced control over the first switch transistor, the second switch transistor, the third switch transistor and the fourth switch transistor.

Specifically, according to an embodiment of the present disclosure, the selecting the manner from the first manner and the second manner for controlling the H bridge according to the relation between the first total working time $T_{total1}$ and the second total working time $T_{total2}$ includes: if the first total working time $T_{total1}$ is larger than the second total working time $T_{total2}$, selecting the second manner B for controlling the H bridge when the vehicle-mounted charger starts to charge the power battery or the power battery starts to outwardly discharge via the vehicle-mounted charger till the second total working time $T_{total2}$ that the H bridge works in the second manner B is equal to the first total working time $T_{total1}$ that the H bridge works in the first manner A, and then performing the alternate control on the H bridge according to the first predetermined charging time Tx and the second predetermined charging time Ty when the power battery is charged by the vehicle-mounted charger or performing the alternate control on the H bridge according to the first predetermined discharging time Tm and the second predetermined discharging time Tn when the power battery outwardly discharges via the vehicle-mounted charger; if the first total working time $T_{total1}$ is smaller than the second total working time $T_{total2}$, selecting the first manner A for controlling the H bridge when the vehicle-mounted charger starts to charge the power battery or the power battery starts to outwardly discharge via the vehicle-mounted charger till the first total working time $T_{total1}$ that the H bridge works in the first manner A is equal to the second total working time $T_{total2}$ that the H bridge works in the second manner B, and then performing the alternate control on the H bridge according to the first predetermined charging time Tx and the second predetermined charging time Ty when the power battery is charged by the vehicle-mounted charger or performing the alternate control on the H bridge according to the first predetermined discharging time Tm and the second predetermined discharging time Tn when the power battery outwardly discharges via the vehicle-mounted charger; if the first total working time $T_{total1}$ is equal to the second total working time $T_{total2}$, selecting the first manner A or second manner B for controlling the H bridge when the vehicle-mounted charger starts to charge the power battery or the power battery starts to outwardly discharge via the vehicle-mounted charger, and then performing the alternate control on the H bridge according to the first predetermined charging time Tx and the second predetermined charging time Ty when the power battery is charged by the vehicle-mounted charger or performing the alternate control on the H bridge according to the first predetermined discharging time Tm and the second predetermined discharging time Tn when the power battery outwardly discharges via the vehicle-mounted charger.

The alternate control on the H bridge according to the first predetermined charging time Tx and the second predetermined charging time Ty when the power battery is charged by the vehicle-mounted charger includes: when a time of controlling the H bridge in the first manner A reaches the first predetermined charging time Tx, controlling the H bridge in the second manner B till a time of controlling the H bridge in the second manner B reaches the second predetermined charging time Ty; or when a time of controlling the H bridge in the second manner B reaches the second predetermined charging time Ty, controlling the H bridge in the first manner A till a time of controlling the H bridge in the first manner A reaches the first predetermined charging time Tx.

The alternate control on the H bridge according to the first predetermined discharging time Tm and the second predetermined discharging time Tn when the power battery outwardly discharges via the vehicle-mounted charger includes: when a time of controlling the H bridge in the first manner A reaches the first predetermined discharging time Tm, controlling the H bridge in the second manner B till a time of controlling the H bridge in the second manner B reaches the second predetermined discharging time Tn; or when a time of controlling the H bridge in the second manner B reaches the second predetermined discharging time Tn, controlling the H bridge in the first manner A till a time of controlling the H bridge in the first manner A reaches the first predetermined discharging time Tm.

That is to say, before the vehicle-mounted charger charges the power battery or before the power battery outwardly discharges via the vehicle-mounted charger, the first total charging time TA that the H bridge is controlled in the first manner A and the first total discharging time TC that the H bridge is controlled in the first manner A as well as the second total charging time TB that the H bridge is controlled in the second manner B and the second total discharging time TD that the H bridge is controlled in the second manner B are obtained from a storage region. Then the first total working time $T_{total1}$ that the H bridge is controlled in the first manner A to charge the power battery and to enable the power battery to outwardly discharge is calculated, the second total working time $T_{total2}$ that the H bridge is controlled in the second manner B to charge the power battery and to enable the power battery to outwardly discharge is calculated, and the aim of determining the first total working time $T_{total1}$ and the second total working time $T_{total2}$ is to confirm the firstly selected manner of controlling the H bridge when the vehicle-mounted charger starts to charge the power battery or the power battery starts to outwardly discharge.

For example, the calculated $T_{total1}$ is 40 minutes and the calculated $T_{total2}$ is 38 minutes, then when the vehicle-mounted charger charges the power battery, firstly the H bridge is controlled by selecting the second manner B to enable the vehicle-mounted charger to charge the power battery, after 2 minutes, the H bridge is switched to be controlled by using the first manner A to charge the power battery via the vehicle-mounted charger till the time that the H bridge is controlled in the first manner A reaches Tx, then the H bridge is switched to be controlled by using the second manner B till the time that the H bridge is controlled by the second manner B reaches Ty, thereby finishing one charging cycle (i.e., the time of one charging cycle equals to Tx+Ty); then the H bridge is switched to be controlled by using the first manner A to enable the vehicle-mounted charger to charge the power battery till the time that the H bridge is controlled by using the first manner A reaches Tx, then the H bridge is switched to be controlled by using the second manner B to enable the vehicle-mounted charger to charge the power battery till the time that the H bridge is controlled by using the second manner B reaches Ty, . . . , and the like, thereby realizing the alternative control over the H bridge, and further performing the temperature balanced control over the first switch transistor, the second switch transistor, the third switch transistor and the fourth switch transistor. If the calculated $T_{total1}$ is 38 minutes and $T_{total2}$ is 40 minutes, then when the vehicle-mounted charger charges the power battery, firstly the H bridge is controlled by selecting the first manner A to enable the vehicle-mounted charger to charge the power battery, after 2 minutes, the H bridge is switched to be controlled by using the second manner B to charge the power battery via the vehicle-mounted charger till the time that the H bridge is controlled by the second manner B reaches Ty, then the H bridge is switched to be controlled by using the first manner A till the time that the H bridge is controlled in the first manner A reaches Tx, thereby finishing one charging cycle (i.e., the time of one charging cycle equals to Tx+Ty); then the H bridge is switched to be controlled by using the second manner B to enable the vehicle-mounted charger to charge the power battery till the time that the H bridge is controlled by using the second manner B reaches Ty, then the H bridge is switched to be controlled by using the first manner A to enable the vehicle-mounted charger to charge the power battery till the time that the H bridge is controlled by using the first manner A reaches Tx, . . . , and the like, thereby realizing the alternative control over the H bridge, and further performing the temperature balanced control over the first switch transistor, the second switch transistor, the third switch transistor and the fourth switch transistor.

Certainly, when the calculated $T_{total1}$ equals to the calculated $T_{total2}$, then when the vehicle-mounted charger charges the power battery, firstly the H bridge is controlled by directly selecting the first manner A to enable the vehicle-mounted charger to charge the power battery, till the time that the H bridge is controlled in the first manner A reaches Tx, then the H bridge is switched to be controlled by using the second manner B to enable the vehicle-mounted charger to charge the power battery till the time that the H bridge is controlled by the second manner B reaches Ty, thereby finishing one charging cycle (i.e., the time of one charging cycle equals to Tx+Ty); then the H bridge is switched to be controlled by using the first manner A to enable the vehicle-mounted charger to charge the power battery till the time that the H bridge is controlled by using the first manner A reaches Tx, then the H bridge is switched to be controlled by using the second manner B to enable the vehicle-mounted charger to charge the power battery till the time that the H bridge is controlled by using the second manner B reaches Ty, and so on, thereby realizing the alternative control over the H bridge, and further performing the temperature balanced control over the first switch transistor, the second switch transistor, the third switch transistor and the fourth switch transistor. Or, when the calculated $T_{total1}$ equals to $T_{total2}$, then when the vehicle-mounted charger charges the power battery, firstly the H bridge is controlled by directly selecting the second manner B to enable the vehicle-mounted charger to charge the power battery, till the time that the H bridge is controlled by the second manner B reaches Ty, then the H bridge is switched to be controlled by using the first manner A to enable the vehicle-mounted charger to charge the power battery till the time that the H bridge is controlled in the first manner A reaches Tx, thereby finishing one charging cycle; such charging cycle is repeatedly performed till the charging of the power battery is finished.

After the manner is selected during each charging cycle, the H bridge is controlled to charge the power battery according to a fixed manner, i.e., the first or second manner, the total charging time is recorded when the manner is switched, for example, when the H bridge is firstly controlled by using the first manner, the first total charging time, recorded in this manner switching, is the first total charging time obtained from the storage region when this charging starts plus the charging time recorded in the charging cycle of this time.

In one embodiment of the present disclosure, the first predetermined charging time Tx that the H bridge is controlled in the first manner A is equal to the second predetermined charging time Ty that the H bridge is controlled in the second manner B, thereby precisely controlling heating of the first switch transistor, the second switch transistor, the third switch transistor and the fourth switch transistor to be relatively balanced.

Figure 9:
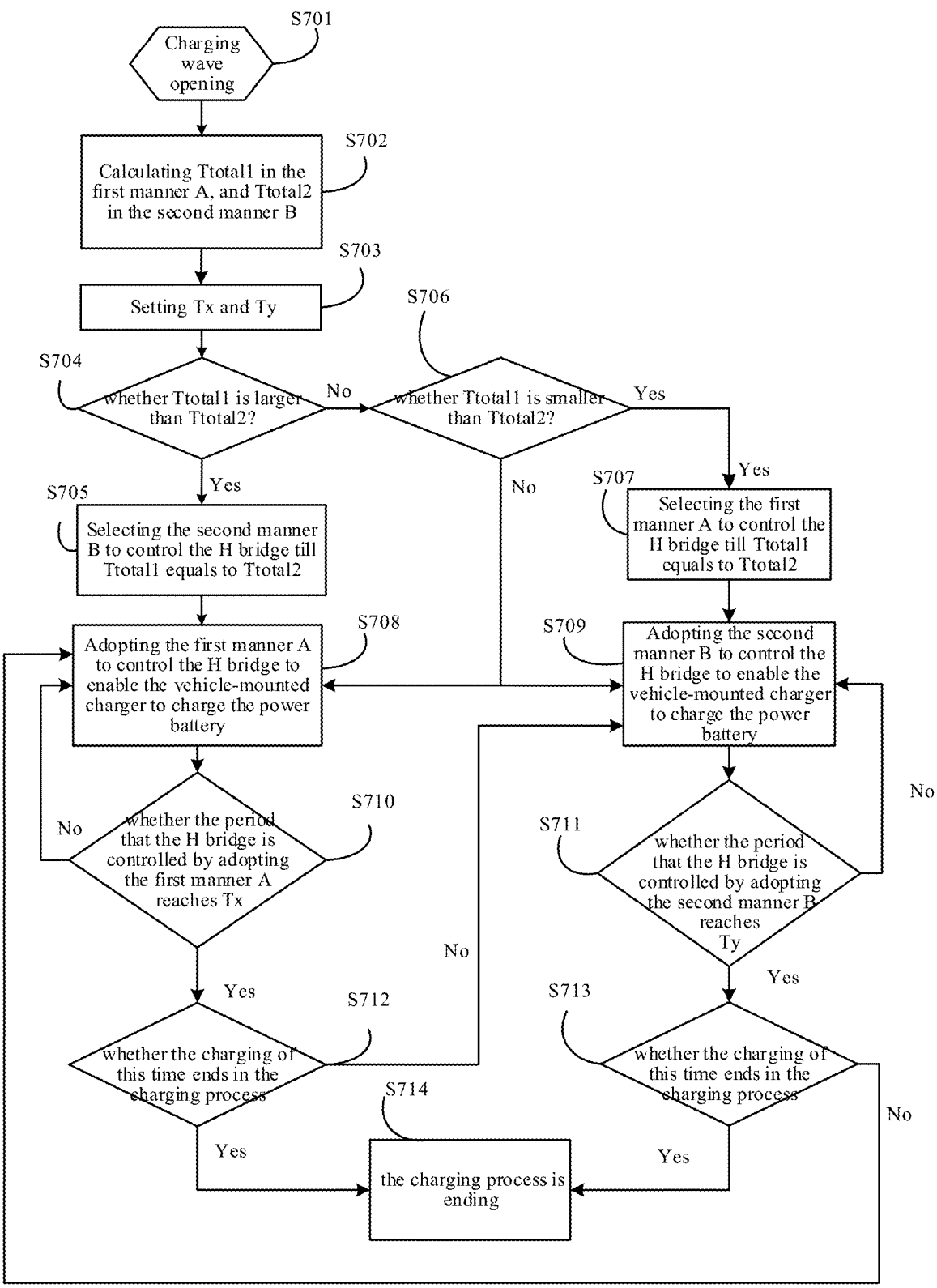
FIG. 9 is a control flow chart when a power battery is charged via a vehicle-mounted charger according to a specific embodiment of the present disclosure.

Specifically, according to one embodiment of the present disclosure, as shown in FIG. 9, the method for controlling a vehicle-mounted charger of an electric vehicle includes the followings.

At step S701, a charging wave is opened, i.e., when the vehicle-mounted charger charges the power battery, a control waveform needs to be output to control the switch transistors in the H bridge.

At step S702, a first total working time $T_{total1}$ in the first manner A, and a second total working time $T_{total2}$ in the second manner B are calculated.

At step S703, a first predetermined charging time Tx and a second predetermined charging time Ty are set.

At step S704, it is determined whether $T_{total1}$ is larger than $T_{total2}$. If yes, step S705 is executed, and if not, step S706 is executed.

At step S705, the second manner B is selected to control the H bridge till $T_{total1}$ equals to $T_{total2}$, then step S708 is executed.

At step S706, it is determined whether $T_{total1}$ is smaller than $T_{total2}$. If yes, step S707 is executed and if not, step S708 or step S709 is executed.

At step S707, the first manner A is selected to control the H bridge till $T_{total1}$ equals to $T_{total2}$, then step S709 is executed.

At step S708, the first manner A is adopted to control the H bridge to enable the vehicle-mounted charger to charge the power battery, then step S710 is executed.

At step S709, the second manner B is adopted to control the H bridge to enable the vehicle-mounted charger to charge the power battery, then step S711 is executed.

At step S710, it is determined whether the time that the H bridge is controlled by using the first manner A reaches Tx. If yes, step S712 is executed, and if not, it is returned to step S708.

At step S711, it is determined whether the time that the H bridge is controlled by using the second manner B reaches Ty. If yes, step S713 is executed, and, if not, it is returned to step S709.

At step S712, it is determined whether the charging of this time ends during the charging process. If yes, step S714 is executed and if not, it is returned to continue to determine in step 709.

At step S713, it is determined whether the charging of this time ends during the charging process. If yes, step S714 is executed and if not, it is returned to continue to determine in step 708.

At step S714, the charging process ends.

For another example, the calculated $T_{total1}$ is 40 minutes, $T_{total2}$ is 38 minutes, then when the power battery outwardly discharges via the vehicle-mounted charger, firstly the H bridge is controlled by selecting the second manner B to enable the power battery to outwardly discharge via the vehicle-mounted charger, after 2 minute, the H bridge is switched to be controlled by using the first manner A to enable the power battery to outwardly discharge via the vehicle-mounted charger till the time that the H bridge is controlled in the first manner A reaches Tm, then the H bridge is switched to be controlled by using the second manner B till the time that the H bridge is controlled by the second manner B reaches Tn, thereby finishing one discharging cycle (i.e., the time of one discharging cycle equals to Tm+Tn); then the H bridge is switched to be controlled by using the first manner A to enable the power battery to outwardly discharge via the vehicle-mounted charger till the time that the H bridge is controlled by using the first manner A reaches Tm, then the H bridge is switched to be controlled by using the second manner B to enable the power battery to outwardly discharge via the vehicle-mounted charger till the time that the H bridge is controlled by using the second manner B reaches Tn, and so on, thereby realizing the alternative control over the H bridge, and further performing the temperature balanced control over the first switch transistor, the second switch transistor, the third switch transistor and the fourth switch transistor. If the calculated $T_{total1}$ is 38 minutes, $T_{total2}$ is 40 minutes, then when the power battery outwardly discharges via the vehicle-mounted charger, firstly the H bridge is controlled by selecting the first manner A to enable the power battery to outwardly discharge via the vehicle-mounted charger, after 2 minutes, the H bridge is switched to be controlled by using the second manner B to enable the power battery to outwardly discharge via the vehicle-mounted charger till the time that the H bridge is controlled in the second manner B reaches Tn, then the H bridge is switched to be controlled by using the first manner A till the time that the H bridge is controlled in the first manner A reaches Tm, thereby finishing one discharging cycle (i.e., the time of one discharging cycle equals to Tm+Tn); then the H bridge is switched to be controlled by using the second manner B to enable the power battery to outwardly discharge via the vehicle-mounted charger till the time that the H bridge is controlled by using the second manner B reaches Tn, then the H bridge is switched to be controlled by using the first manner A to enable the power battery to outwardly discharge via the vehicle-mounted charger till the time that the H bridge is controlled by using the first manner A reaches Tm, and so on, thereby realizing the alternative control over the H bridge, and further performing the temperature balanced control over the first switch transistor, the second switch transistor, the third switch transistor and the fourth switch transistor.

Certainly, when the calculated $T_{total1}$ equals to $T_{total2}$, then when the power battery outwardly discharges via the vehicle-mounted charger, firstly the H bridge is controlled by directly selecting the first manner A to enable the power battery to outwardly discharge via the vehicle-mounted charger, till the time that the H bridge is controlled in the first manner A reaches Tm, then the H bridge is switched to be controlled by using the second manner B to enable the power battery to outwardly discharge via the vehicle-mounted charger till the time that the H bridge is controlled in the second manner B reaches Tn, thereby finishing one discharging cycle (i.e., the time of one discharging cycle equals to Tm+Tn); then the H bridge is switched to be controlled by using the first manner A to enable the power battery to outwardly discharge via the vehicle-mounted charger till the time that the H bridge is controlled by using the first manner A reaches Tm, then the H bridge is switched to be controlled by using the second manner B to enable the power battery to outwardly discharge via the vehicle-mounted charger till the time that the H bridge is controlled by using the second manner B reaches Tn, and so on, thereby realizing the alternative control over the H bridge, and further performing the temperature balanced control over the first switch transistor, the second switch transistor, the third switch transistor and the fourth switch transistor. Or, when the calculated $T_{total1}$ equals to $T_{total2}$, then when the power battery outwardly discharges via the vehicle-mounted charger, firstly the H bridge is controlled by directly selecting the second manner B to enable the power battery to outwardly discharge via the vehicle-mounted charger, till the time that the H bridge is controlled by the second manner B reaches Tn, then the H bridge is switched to be controlled by using the first manner A to enable the power battery to outwardly discharge via the vehicle-mounted charger till the time that the H bridge is controlled in the first manner A reaches Tm, thereby finishing one discharging cycle; such discharging cycle is repeatedly performed till the discharging of the power battery is finished.

After the manner is selected during each discharging cycle, the H bridge is controlled to discharge the power battery according to a fixed manner, i.e., the first or second manner, the total discharging time is recorded when the manner is switched, for example, when the H bridge is firstly controlled by using the first manner, the first total discharging time, recorded in this manner switching, is the first total discharging time obtained from the storage region when this time of discharging starts plus the discharging time recorded in the discharging cycle of this time.

In one embodiment of the present disclosure, the first predetermined discharging time Tm that the H bridge is controlled in the first manner A is equal to the second predetermined discharging time Tn that the H bridge is controlled in the second manner B, thereby precisely controlling heating of the first switch transistor, the second switch transistor, the third switch transistor and the fourth switch transistor to be relatively balanced.

Figure 10:
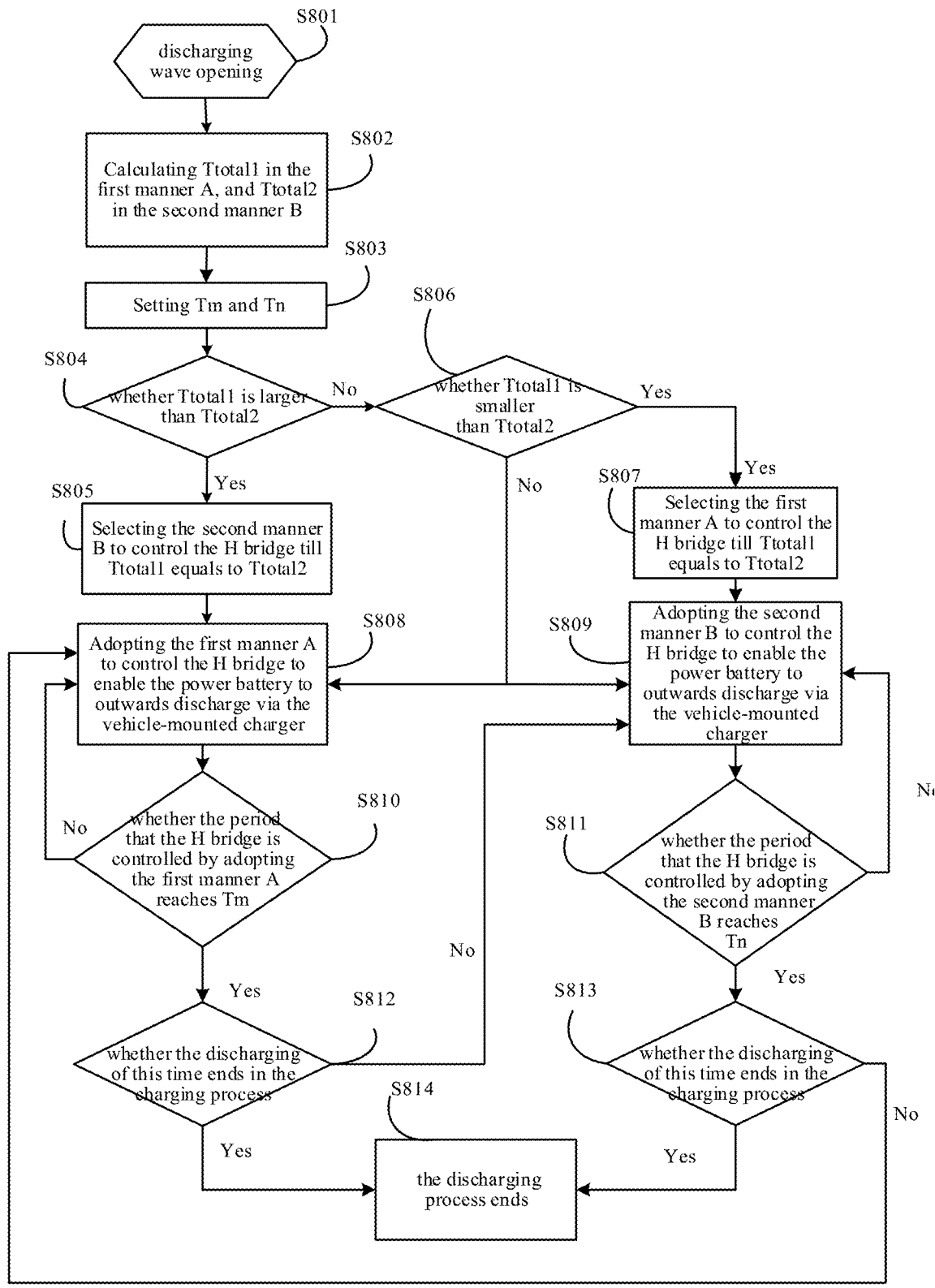
FIG. 10 is a control flow chart when a power battery discharges via a vehicle-mounted charger according to a specific embodiment of the present disclosure.

Specifically, according to one embodiment of the present disclosure, as shown in FIG. 10, the method for controlling a vehicle-mounted charger of an electric vehicle includes the followings.

At step S801, a discharging wave is opened, i.e., when the power battery outwardly discharges via the vehicle-mounted charger, a control waveform needs to be output to control the switch transistors in the H bridge.

At step S802, a first total working time $T_{total1}$ in the first manner A, and a second total working time $T_{total2}$ in the second manner B are calculated.

At step S803, a first predetermined discharging time Tm and a second predetermined discharging time Tn are set.

At step S804, it is determined whether $T_{total1}$ is larger than $T_{total2}$. If yes, step S805 is executed, and if not, step S806 is executed.

At step S805, the second manner B is selected to control the H bridge till $T_{total1}$ equals to $T_{total2}$, then step S808 is executed.

At step S806, it is determined whether $T_{total1}$ is smaller than $T_{total2}$. If yes, step S807 is executed and if not, step S808 or S809 is executed.

At step S807, the first manner A is selected to control the H bridge till $T_{total1}$ equals to $T_{total2}$, then step S809 is executed.

At step S808, the first manner A is adopted to control the H bridge to enable the power battery to outwardly discharge via the vehicle-mounted charger, and then step S810 is executed.

At step S809, the second manner B is adopted to control the H bridge to enable the power battery to outwardly discharge via the vehicle-mounted charger, and then step S811 is executed.

At step S810, it is determined whether the time that the H bridge is controlled by using the first manner A reaches Tm. If yes, step S812 is executed, and if not, it is returned to step S808.

At step S811, it is determined whether the time that the H bridge is controlled by using the second manner B reaches Tn. If yes, step S813 is executed, and if not, it is returned to step S809.

At step S812, it is determined whether the discharging of this time ends during the discharging process. If yes, step S814 is executed and if not, it is returned to continue to determine in step 809.

At step S813, it is determined whether the discharging of this time ends during the discharging process. If yes, step S814 is executed and if not, it is returned to continue to determine in step 808.

At step S814, the discharging process ends.

Therefore, according to the method for controlling a vehicle-mounted charger of an electric vehicle, in the process that the vehicle-mounted charger charges the power battery every time or the power battery outwardly discharges via the vehicle-mounted charger every time, the heating of the first switch transistor, the second switch transistor, the third switch transistor and the fourth switch transistor is enabled to be relative balanced, and the service life of the vehicle-mounted charger is prolonged.

According to the method for controlling a vehicle-mounted charger of an electric vehicle in embodiments of the present disclosure, the first total working time of the H bridge in the first manner is calculated according to the obtained first total charging time and the obtained first total discharging time, and the second total working time of the H bridge in the second manner is calculated according to the obtained second total charging time and the obtained second total discharging time, and then the manner for controlling the H bridge is selected from the first manner and the second manner according to the relation between the first total working time and the second total working time; and then the alternate control is performed on the H bridge according to the first predetermined charging time and the second predetermined charging time when the vehicle-mounted charger charges the power battery, or the alternate control is performed on the H bridge according to the first predetermined discharging time and the second predetermined discharging time when the power battery outwardly discharges via the vehicle-mounted charger, so as to perform a temperature balanced control over the first switch transistor, the second switch transistor, the third switch transistor and the fourth switch transistor, such that the heating of each switch transistor is relatively balanced, the service life of the switch transistors in the H bridge is prolonged, and thus the service time is prolonged.

As shown in FIGS. 1 to 3, a vehicle-mounted charger according to embodiments of the present disclosure includes an H bridge and a controller such as an MCU (Micro Control Unit). The H bridge includes a first switch transistor T1, a second switch transistor T2, a third switch transistor T3 and a fourth switch transistor T4. The controller is configured to obtain a first total charging time TA for controlling the H bridge in a first manner, a second total charging time TB for controlling the H bridge in a second manner, a first total discharging time TC for controlling the H bridge in the first manner and a second total discharging time TD for controlling the H bridge in the second manner; to calculate a first total working time $T_{total1}$ of the H bridge in the first manner according to the first total charging time TA and the first total discharging time TC and to calculate a second total working time $T_{total2}$ of the H bridge in the second manner according to the second total charging time TB and the second total discharging time TD; to obtain a first predetermined charging time Tx for controlling the H bridge in the first manner, a second predetermined charging time Ty for controlling the H bridge in the second manner, a first predetermined discharging time Tm for controlling the H bridge in the first manner and a second predetermined discharging time Tn for controlling the H bridge in the second manner; to select a manner for controlling the H bridge according to a relation between the first total working time $T_{total1}$ and the second total working time $T_{total2}$; and to perform an alternate control on the H bridge according to the first predetermined charging time Tx and the second predetermined charging time Ty if the vehicle-mounted charger charges the power battery or according to the first predetermined discharging time Tm and the second predetermined discharging time Tn if the power battery discharges via the vehicle-mounted charger, in which the first predetermined charging time Tx and the second predetermined charging time Ty are preset for each charging cycle of a charging process of the power battery, and the first predetermined discharging time Tm and the second predetermined discharging time Tn are preset for each discharging cycle of a discharging process of the power battery.

That is to say, in an embodiment of the present disclosure, the H bridge is controlled by using the first manner A, such that when the vehicle-mounted charger charges the power battery, the time that the H bridge is controlled in the first manner A is recorded, thus the first total charging time TA for controlling the H bridge in the first manner is obtained, and then is stored; the H bridge is controlled by using the first manner A, such that when the power battery outwardly discharges via the vehicle-mounted charger, the time that the H bridge is controlled in the first manner A is recorded, thus the first total discharging time TC for controlling the H bridge in the first manner is obtained, and then is stored; the H bridge is controlled by using the second manner B, such that when the vehicle-mounted charger charges the power battery, the time that the H bridge is controlled by the second manner B is recorded, thus the second total charging time TB for controlling the H bridge in the second manner is obtained, and then is stored; the H bridge is controlled by using the second manner B, such that when the power battery outwardly discharges via the vehicle-mounted charger, the time that the H bridge is controlled by the second manner B is recorded, thus the second total discharging time TD for controlling the H bridge in the second manner is obtained, and then is stored. Then, the first total working time $T_{total1}$ that the H bridge is controlled in the first manner A to charge the power battery and to enable the power battery to outwardly discharge is calculated, the second total working time $T_{total2}$ that the H bridge is controlled in the second manner B to charge the power battery and to enable the power battery to outwardly discharge is calculated, and the relation between the first total working time $T_{total1}$ and the second total working time $T_{total2}$ is determined. Finally, the manner of controlling the H bridge is selected according to the relation between the first total working time $T_{total1}$ and the second total working time $T_{total2}$, thereby realizing the temperature balanced control over the first switch transistor, the second switch transistor, the third switch transistor and the fourth switch transistor.

In an embodiment of the present disclosure, the controller is further configured to: select the manner from the first manner and the second manner for controlling the H bridge according to the relation between the first total working time $T_{total1}$ and the second total working time $T_{total2}$; and control the H bridge in the selected manner, until the first total working time $T_{total1}$ is equal to the second total working time $T_{total2}$.

Specifically, according to an embodiment of the present disclosure, the selecting the manner from the first manner and the second manner for controlling the H bridge according to the relation between the first total working time $T_{total1}$ and the second total working time $T_{total2}$ includes: if the first total working time $T_{total1}$ is larger than the second total working time $T_{total2}$, selecting the second manner B for controlling the H bridge when the vehicle-mounted charger starts to charge the power battery or the power battery starts to outwardly discharge via the vehicle-mounted charger till the second total working time $T_{total2}$ that the H bridge works in the second manner B is equal to the first total working time $T_{total1}$ that the H bridge works in the first manner A, and then performing the alternate control on the H bridge according to the first predetermined charging time Tx and the second predetermined charging time Ty when the power battery is charged by the vehicle-mounted charger or performing the alternate control on the H bridge according to the first predetermined discharging time Tm and the second predetermined discharging time Tn when the power battery outwardly discharges via the vehicle-mounted charger; if the first total working time $T_{total1}$ is smaller than the second total working time $T_{total2}$, selecting the first manner A for controlling the H bridge when the vehicle-mounted charger starts to charge the power battery or the power battery starts to outwardly discharge via the vehicle-mounted charger till the first total working time $T_{total1}$ that the H bridge works in the first manner A is equal to the second total working time $T_{total2}$ that the H bridge works in the second manner B, and then performing the alternate control on the H bridge according to the first predetermined charging time Tx and the second predetermined charging time Ty when the power battery is charged by the vehicle-mounted charger or performing the alternate control on the H bridge according to the first predetermined discharging time Tm and the second predetermined discharging time Tn when the power battery outwardly discharges via the vehicle-mounted charger; if the first total working time $T_{total1}$ is equal to the second total working time $T_{total2}$, selecting the first manner A or second manner B for controlling the H bridge when the vehicle-mounted charger starts to charge the power battery or the power battery starts to outwardly discharge via the vehicle-mounted charger, and then performing the alternate control on the H bridge according to the first predetermined charging time Tx and the second predetermined charging time Ty when the power battery is charged by the vehicle-mounted charger or performing the alternate control on the H bridge according to the first predetermined discharging time Tm and the second predetermined discharging time Tn when the power battery outwardly discharges via the vehicle-mounted charger.

The alternate control on the H bridge according to the first predetermined charging time Tx and the second predetermined charging time Ty when the power battery is charged by the vehicle-mounted charger includes: when a time of controlling the H bridge in the first manner A reaches the first predetermined charging time Tx, controlling the H bridge in the second manner B till a time of controlling the H bridge in the second manner B reaches the second predetermined charging time Ty; or when a time of controlling the H bridge in the second manner B reaches the second predetermined charging time Ty, controlling the H bridge in the first manner A till a time of controlling the H bridge in the first manner A reaches the first predetermined charging time Tx.

The alternate control on the H bridge according to the first predetermined discharging time Tm and the second predetermined discharging time Tn when the power battery outwardly discharges via the vehicle-mounted charger includes: when a time of controlling the H bridge in the first manner A reaches the first predetermined discharging time Tm, controlling the H bridge in the second manner B till a time of controlling the H bridge in the second manner B reaches the second predetermined discharging time Tn; or when a time of controlling the H bridge in the second manner B reaches the second predetermined discharging time Tn, controlling the H bridge in the first manner A till a time of controlling the H bridge in the first manner A reaches the first predetermined discharging time Tm.

That is to say, before the vehicle-mounted charger charges the power battery or before the power battery outwardly discharges via the vehicle-mounted charger, the first total charging time TA that the H bridge is controlled in the first manner A and the first total discharging time TC that the H bridge is controlled in the first manner A as well as the second total charging time TB that the H bridge is controlled in the second manner B and the second total discharging time TD that the H bridge is controlled in the second manner B are obtained from a storage region. Then the first total working time $T_{total1}$ that the H bridge is controlled in the first manner A to charge the power battery and to enable the power battery to outwardly discharge is calculated, the second total working time $T_{total2}$ that the H bridge is controlled in the second manner B to charge the power battery and to enable the power battery to outwardly discharge is calculated, and the aim of determining the first total working time $T_{total1}$ and the second total working time $T_{total2}$ is to confirm the firstly selected manner of controlling the H bridge when the vehicle-mounted charger starts to charge the power battery or the power battery starts to outwardly discharge.

For example, the calculated $T_{total1}$ is 40 minutes and $T_{total2}$ is 38 minutes, then when the vehicle-mounted charger charges the power battery, firstly the H bridge is controlled by selecting the second manner B to enable the vehicle-mounted charger to charge the power battery, after 2 minutes, the H bridge is switched to be controlled by using the first manner A to charge the power battery via the vehicle-mounted charger till the time that the H bridge is controlled in the first manner A reaches Tx, then the H bridge is switched to be controlled by using the second manner B till the time that the H bridge is controlled by the second manner B reaches Ty, thereby finishing one charging cycle (i.e., the time of one charging cycle equals to Tx+Ty); then the H bridge is switched to be controlled by using the first manner A to enable the vehicle-mounted charger to charge the power battery till the time that the H bridge is controlled by using the first manner A reaches Tx, then the H bridge is switched to be controlled by using the second manner B to enable the vehicle-mounted charger to charge the power battery till the time that the H bridge is controlled by using the second manner B reaches Ty, . . . , and the like, thereby realizing the alternative control over the H bridge, and further performing the temperature balanced control over the first switch transistor, the second switch transistor, the third switch transistor and the fourth switch transistor. If the calculated $T_{total1}$ is 38 minutes and $T_{total2}$ is 40 minutes, then when the vehicle-mounted charger charges the power battery, firstly the H bridge is controlled by selecting the first manner A to enable the vehicle-mounted charger to charge the power battery, after 2 minutes, the H bridge is switched to be controlled by using the second manner B to charge the power battery via the vehicle-mounted charger till the time that the H bridge is controlled by the second manner B reaches Ty, then the H bridge is switched to be controlled by using the first manner A till the time that the H bridge is controlled in the first manner A reaches Tx, thereby finishing one charging cycle (i.e., the time of one charging cycle equals to Tx+Ty); then the H bridge is switched to be controlled by using the second manner B to enable the vehicle-mounted charger to charge the power battery till the time that the H bridge is controlled by using the second manner B reaches Ty, then the H bridge is switched to be controlled by using the first manner A to enable the vehicle-mounted charger to charge the power battery till the time that the H bridge is controlled by using the first manner A reaches Tx, . . . , and the like, thereby realizing the alternative control over the H bridge, and further performing the temperature balanced control over the first switch transistor, the second switch transistor, the third switch transistor and the fourth switch transistor.

Certainly, when the calculated $T_{total1}$ equals to $T_{total2}$, then when the vehicle-mounted charger charges the power battery, firstly the H bridge is controlled by directly selecting the first manner A to enable the vehicle-mounted charger to charge the power battery, till the time that the H bridge is controlled in the first manner A reaches Tx, then the H bridge is switched to be controlled by using the second manner B to enable the vehicle-mounted charger to charge the power battery till the time that the H bridge is controlled by the second manner B reaches Ty, thereby finishing one charging cycle (i.e., the time of one charging cycle equals to Tx+Ty); then the H bridge is switched to be controlled by using the first manner A to enable the vehicle-mounted charger to charge the power battery till the time that the H bridge is controlled by using the first manner A reaches Tx, then the H bridge is switched to be controlled by using the second manner B to enable the vehicle-mounted charger to charge the power battery till the time that the H bridge is controlled by using the second manner B reaches Ty, and so on, thereby realizing the alternative control over the H bridge, and further performing the temperature balanced control over the first switch transistor, the second switch transistor, the third switch transistor and the fourth switch transistor. Or, when the calculated $T_{total1}$ equals to $T_{total2}$, then when the vehicle-mounted charger charges the power battery, firstly the H bridge is controlled by directly selecting the second manner B to enable the vehicle-mounted charger to charge the power battery, till the time that the H bridge is controlled by the second manner B reaches Ty, then the H bridge is switched to be controlled by using the first manner A to enable the vehicle-mounted charger to charge the power battery till the time that the H bridge is controlled in the first manner A reaches Tx, thereby finishing one charging cycle; such charging cycle is repeatedly performed till the charging of the power battery is finished.

In an embodiment of the present disclosure, the first predetermined charging time Tx that the H bridge is controlled in the first manner equals to the second predetermined charging time Ty that the H bridge is controlled in the second manner.

According to an embodiment of the present disclosure, if the H bridge is controlled in the first manner A to charge a power battery, and when a power grid transient voltage value of the vehicle-mounted charger is larger than 0, the first switch transistor T1 is controlled to be ON, the second switch transistor T2 is controlled to be OFF, and the third switch transistor T3 and the fourth switch transistor T4 are controlled to be ON and OFF complementarily and alternately. When the third switch transistor T3 and the fourth switch transistor T4 are controlled to be ON and OFF alternately and complementarily, the PWM waveform of the third switch transistor T3 and the PWM waveform of the fourth switch transistor T4 are controlled to be complementary with each other, and a duty ratio of the PWM waveform of the third switch transistor T3 is controlled from large to small and then to large, and a duty ratio of the PWM waveform of the fourth switch transistor T4 is controlled from small to large and then to small. When the power grid transient voltage value of the vehicle-mounted charger is smaller than 0, the third switch transistor T3 is controlled to be ON, the fourth switch transistor T4 is controlled to be OFF, and the first switch transistor T1 and the second switch transistor T2 are controlled to be ON and OFF complementarily and alternately. When the first switch transistor T1 and the second switch transistor T2 are controlled to be ON and OFF alternately and complementarily, the PWM waveform of the first switch transistor T1 and the PWM waveform of the second switch transistor T2 are controlled to be complementary with each other, and a duty ratio of the PWM waveform of the first switch transistor T1 is controlled from large to small and then to large, and a duty ratio of the PWM waveform of the second switch transistor T2 is controlled from small to large and then to small.

According to an embodiment of the present disclosure, if the H bridge is controlled in the second manner B to charge a power battery, and when a power grid transient voltage value of the vehicle-mounted charger is larger than 0, the second switch transistor T2 is controlled to be ON, the first switch transistor T1 is controlled to be OFF, and the third switch transistor T3 and the fourth switch transistor T4 are controlled to be ON and OFF complementarily and alternately. When the third switch transistor T3 and the fourth switch transistor T4 are controlled to be ON and OFF alternately and complementarily, the PWM waveform of the third switch transistor T3 and the PWM waveform of the fourth switch transistor T4 are controlled to be complementary with each other, and a duty ratio of the PWM waveform of the third switch transistor T3 is controlled from small to large and then to small, and a duty ratio of the PWM waveform of the fourth switch transistor T4 is controlled from large to small and then to large. When the power grid transient voltage value of the vehicle-mounted charger is smaller than 0, the fourth switch transistor T4 is controlled to be ON, the third switch transistor T3 is controlled to be OFF, and the first switch transistor T1 and the second switch transistor T2 are controlled to be ON and OFF complementarily and alternately. When the first switch transistor T1 and the second switch transistor T2 are controlled to be ON and OFF alternately and complementarily, the PWM waveform of the first switch transistor T1 and the PWM waveform of the second switch transistor T2 are controlled to be complementary with each other, and a duty ratio of the PWM waveform of the first switch transistor T1 is controlled from small to large and then to small, and a duty ratio of the PWM waveform of the second switch transistor T2 is controlled from large to small and then to large.

For another example, the calculated $T_{total1}$ is 40 minutes, $T_{total2}$ is 38 minutes, then when the power battery outwardly discharges via the vehicle-mounted charger, firstly the H bridge is controlled by selecting the second manner B to enable the power battery to outwardly discharge via the vehicle-mounted charger, after 2 minute, the H bridge is switched to be controlled by using the first manner A to enable the power battery to outwardly discharge via the vehicle-mounted charger till the time that the H bridge is controlled in the first manner A reaches Tm, then the H bridge is switched to be controlled by using the second manner B till the time that the H bridge is controlled by the second manner B reaches Tn, thereby finishing one discharging cycle (i.e., the time of one discharging cycle equals to Tm+Tn); then the H bridge is switched to be controlled by using the first manner A to enable the power battery to outwardly discharge via the vehicle-mounted charger till the time that the H bridge is controlled by using the first manner A reaches Tm, then the H bridge is switched to be controlled by using the second manner B to enable the power battery to outwardly discharge via the vehicle-mounted charger till the time that the H bridge is controlled by using the second manner B reaches Tn, and so on, thereby realizing the alternative control over the H bridge, and further performing the temperature balanced control over the first switch transistor, the second switch transistor, the third switch transistor and the fourth switch transistor. If the calculated $T_{total1}$ is 38 minutes, $T_{total2}$ is 40 minutes, then when the power battery outwardly discharges via the vehicle-mounted charger, firstly the H bridge is controlled by selecting the first manner A to enable the power battery to outwardly discharge via the vehicle-mounted charger, after 2 minutes, the H bridge is switched to be controlled by using the second manner B to enable the power battery to outwardly discharge via the vehicle-mounted charger till the time that the H bridge is controlled by the second manner B reaches Tn, then the H bridge is switched to be controlled by using the first manner A till the time that the H bridge is controlled in the first manner A reaches Tm, thereby finishing one discharging cycle (i.e., the time of one discharging cycle equals to Tm+Tn); then the H bridge is switched to be controlled by using the second manner B to enable the power battery to outwardly discharge via the vehicle-mounted charger till the time that the H bridge is controlled by using the second manner B reaches Tn, then the H bridge is switched to be controlled by using the first manner A to enable the power battery to outwardly discharge via the vehicle-mounted charger till the time that the H bridge is controlled by using the first manner A reaches Tm, and so on, thereby realizing the alternative control over the H bridge, and further performing the temperature balanced control over the first switch transistor, the second switch transistor, the third switch transistor and the fourth switch transistor.

Certainly, when the calculated $T_{total1}$ equals to $T_{total2}$, then when the power battery outwardly discharges via the vehicle-mounted charger, firstly the H bridge is controlled by directly selecting the first manner A to enable the power battery to outwardly discharge via the vehicle-mounted charger, till the time that the H bridge is controlled in the first manner A reaches Tm, then the H bridge is switched to be controlled by using the second manner B to enable the power battery to outwardly discharge via the vehicle-mounted charger till the time that the H bridge is controlled by the second manner B reaches Tn, thereby finishing one discharging cycle (i.e., the time of one discharging cycle equals to Tm+Tn); then the H bridge is switched to be controlled by using the first manner A to enable the power battery to outwardly discharge via the vehicle-mounted charger till the time that the H bridge is controlled by using the first manner A reaches Tm, then the H bridge is switched to be controlled by using the second manner B to enable the power battery to outwardly discharge via the vehicle-mounted charger till the time that the H bridge is controlled by using the second manner B reaches Tn, and so on, thereby realizing the alternative control over the H bridge, and further performing the temperature balanced control over the first switch transistor, the second switch transistor, the third switch transistor and the fourth switch transistor. Or, when the calculated $T_{total1}$ equals to $T_{total2}$, then when the power battery outwardly discharges via the vehicle-mounted charger, firstly the H bridge is controlled by directly selecting the second manner B to enable the power battery to outwardly discharge via the vehicle-mounted charger, till the time that the H bridge is controlled by the second manner B reaches Tn, then the H bridge is switched to be controlled by using the first manner A to enable the power battery to outwardly discharge via the vehicle-mounted charger till the time that the H bridge is controlled in the first manner A reaches Tm, thereby finishing one discharging cycle; such discharging cycle is repeatedly performed till the discharging of the power battery is finished.

In an embodiment of the present disclosure, the first predetermined discharging time Tm that the H bridge is controlled in the first manner equals to the second predetermined discharging time Tn that the H bridge is controlled in the second manner.

According to one embodiment of the present disclosure, if the H bridge is controlled in the first manner A to make a power battery outwardly discharge, and when an outwardly discharging transient voltage value of the vehicle-mounted charger is larger than 0, the first switch transistor T1 is controlled to be ON, the second switch transistor T2 is controlled to be OFF, and the third switch transistor T3 and the fourth switch transistor T4 are controlled to be ON and OFF complementarily and alternately. When the third switch transistor T3 and the fourth switch transistor T4 are controlled to be ON and OFF alternately and complementarily, the PWM waveform of the third switch transistor T3 and the PWM waveform of the fourth switch transistor T4 are controlled to be complementary with each other, and a duty ratio of the PWM waveform of the third switch transistor T3 is controlled from large to small and then to large, and a duty ratio of the PWM waveform of the fourth switch transistor T4 is controlled from small to large and then to small. When the outwardly discharging transient voltage value of the vehicle-mounted charger is smaller than 0, the third switch transistor T3 is controlled to be ON, the fourth switch transistor T4 is controlled to be OFF, and the first switch transistor T1 and the second switch transistor T2 are controlled to be ON and OFF complementarily and alternately. When the first switch transistor T1 and the second switch transistor T2 are controlled to be ON and OFF alternately and complementarily, the PWM waveform of the first switch transistor T1 and the PWM waveform of the second switch transistor T2 are controlled to be complementary with each other, and a duty ratio of the PWM waveform of the first switch transistor T1 is controlled from large to small and then to large, and a duty ratio of the PWM waveform of the second switch transistor T2 is controlled from small to large and then to small.

According to an embodiment of the present disclosure, if the H bridge is controlled in the second manner B to make a power battery discharge outwardly, and when an outwardly discharging transient voltage value of the vehicle-mounted charger is larger than 0, the second switch transistor T2 is controlled to be ON, the first switch transistor T1 is controlled to be OFF, and the third switch transistor T3 and the fourth switch transistor T4 are controlled to be ON and OFF complementarily and alternately. When the third switch transistor T3 and the fourth switch transistor T4 are controlled to be ON and OFF alternately and complementarily, the PWM waveform of the third switch transistor T3 and the PWM waveform of the fourth switch transistor T4 are controlled to be complementary with each other, and a duty ratio of the PWM waveform of the third switch transistor T3 is controlled from small to large and then to small, and a duty ratio of the PWM waveform of the fourth switch transistor T4 is controlled from large to small and then to large. When the outwardly discharging transient voltage value of the vehicle-mounted charger is smaller than 0, the fourth switch transistor T4 is controlled to be ON, the third switch transistor T3 is controlled to be OFF, and the first switch transistor T1 and the second switch transistor T2 are controlled to be ON and OFF complementarily and alternately. When the first switch transistor T1 and the second switch transistor T2 are controlled to be ON and OFF alternately and complementarily, the PWM waveform of the first switch transistor T1 and the PWM waveform of the second switch transistor T2 are controlled to be complementary with each other, and a duty ratio of the PWM waveform of the first switch transistor T1 is controlled from small to large and then to small, and a duty ratio of the PWM waveform of the second switch transistor T2 is controlled from large to small and then to large.

In an embodiment of the present disclosure, as shown in FIG. 1 or FIG. 2 or FIG. 3, the first switch transistor T1, the second switch transistor T2, the third switch transistor T3 and the fourth switch transistor T4 are all IGBTs (Insulated Gate Bipolar Transistors), certainly, in other embodiments of the present disclosure, the first switch transistor T1, the second switch transistor T2, the third switch transistor T3 and the fourth switch transistor T4 can also be MOSs (Metal Oxide Semiconductors).

According to the vehicle-mounted charger of an electric vehicle in embodiments of the present disclosure, the controller calculates the first total working time of the H bridge in the first manner according to the obtained first total charging time and the obtained first total discharging time, and the second total working time of the H bridge in the second manner according to the obtained second total charging time and the obtained second total discharging time, and then selects the manner of controlling the H bridge from the first manner and the second manner according to the relation between the first total working time and the second total working time; and then performs the alternate control on the H bridge according to the first predetermined charging time and the second predetermined charging time when the vehicle-mounted charger charges the power battery, or performs the alternate control on the H bridge according to the first predetermined discharging time and the second predetermined discharging time when the power battery discharges via the vehicle-mounted charger, so as to perform a temperature balanced control over the first switch transistor, the second switch transistor, the third switch transistor and the fourth switch transistor, such that the heating of each switch transistor is relatively balanced, the service life of the switch transistors in the H bridge is prolonged, and thus the service time is prolonged.

In addition, embodiments of the present disclosure also provide an electric vehicle, including the above vehicle-mounted charger of an electric vehicle.

According to the electric vehicle of embodiments of the present disclosure, when the power battery is charged and discharged by the vehicle-mounted charger, the temperature balanced control over the first switch transistor, the second switch transistor, the third switch transistor and the fourth switch transistor in the H bridge can be realized, such that heating of each switch transistor is relative balanced, the service life of the switch transistors in H bridge, therefore, the service life of the vehicle-mounted charger is prolonged.

In the description of the present disclosure, it is understandable that the directions of position relations indicated by the terms "center", "longitudinal", "transverse", "length", "width", "thickness", "upper", "lower", "front", "rear", "left", "right", "vertical", "horizontal", "top", "bottom", "inner", "outer", "clockwise", "counterclockwise", "axial", "radial" and "peripheral" are based on the directions or position relations as shown in the drawings, are merely convenient for describing the present disclosure and simplifying the description rather than indicating or implying the fact that devices or elements must have specific directions, or configured or operated in specific directions, and thus cannot understood as a limitation to the present disclosure.

In addition, the terms "first" and "second" merely aim to describe rather than being understood as indication or implication of relative importance or impliedly indicating a number of the indicated technical features. Therefore, the characteristics defined by "first" and "second" can clearly or impliedly comprise at least one such characteristic. In the description of the present disclosure, "more" means at least two, for example, two, three, etc., unless otherwise clearly specifically defined.

In the present disclosure, unless otherwise clearly specified and defined, the terms "mounted", "jointed", "connected", "fixed", etc., should be generalized understood, for example, the "connected" can be fixedly connected, or detachably connected, or integrated, can be mechanically connected or electrically connected, can also be directly connected or connected by an intermediate medium, and can also be internally communicated of two elements, or interacted of two elements, unless otherwise clearly defined. Those ordinary skilled in the art can understand the specific meaning of the terms in the present disclosure according to specific conditions.

In the present disclosure, unless otherwise clearly specified and defined, the case that a first characteristic is "on" or "under" a second characteristic can be the case that the first characteristic and the second characteristic are in direct contact, or in indirect contact by an intermediate medium. Besides, the case that the first characteristic is "on", "above" and "over" the second characteristic can be the case that the first characteristic is right or obliquely above the second characteristic, or only represents that the horizontal height of the first characteristic is higher than that of the second characteristic. The case that the first characteristic is "under", "below" and "beneath" the second characteristic can be the case that the first characteristic is right or obliquely below the second characteristic, or only represents that the horizontal height of the first characteristic is lower than that of the second characteristic.

In the description of the specification, the description of the reference terms "one embodiment", "some embodiments", "examples", "specific examples" or "some examples" refers to the fact that the specific characteristic, structure, material or feature described in combination with the embodiment or example is contained in the at least one embodiment or example of the present disclosure. In the present specification, and the schematic expression of the above terms unnecessarily aims at the same embodiment or example. In addition, the described specific characteristic, structure, material or feature can be combined in a proper manner in any one or more embodiments or examples. Besides, in the case without mutual contradiction, those skilled in the art can integrate or combine different embodiments or examples or the characteristics of different embodiments or examples described in the present specification.

Although the embodiments of the present disclosure have been shown and described as above, it is understandable that those ordinary skilled in the art can change, modify, substitute and transform the above embodiments in a scope of the present disclosure.

What is claimed is:

1. A method for controlling a vehicle-mounted charger of an electric vehicle, wherein the vehicle-mounted charger comprises an H bridge, and the H bridge comprises a first switch transistor, a second switch transistor, a third switch transistor and a fourth switch transistor, the method comprising:

obtaining a first total charging time (TA) for controlling the H bridge in a first manner, a second total charging time (TB) for controlling the H bridge in a second manner, a first total discharging time (TC) for controlling the H bridge in the first manner and a second total discharging time (TD) for controlling the H bridge in the second manner;

calculating a first total working time ($T_{total1}$) of the H bridge in the first manner according to the first total charging time (TA) and the first total discharging time (TC), and calculating a second total working time ($T_{total2}$) of the H bridge in the second manner according to the second total charging time (TB) and the second total discharging time (TD);

obtaining a first predetermined charging time (Tx) for controlling the H bridge in the first manner, a second predetermined charging time (Ty) for controlling the H bridge in the second manner, a first predetermined discharging time (Tm) for controlling the H bridge in the first manner and a second predetermined discharging time (Tn) for controlling the H bridge in the second manner;

selecting a manner for controlling the H bridge according to a relation between the first total working time ($T_{total1}$) and the second total working time ($T_{total2}$); and performing an alternate control on the H bridge according to the first predetermined charging time (Tx) and the second predetermined charging time (Ty) if the vehicle-mounted charger charges the power battery, or according to the first predetermined discharging time (Tm) and the second predetermined discharging time (Tn) if the power battery discharges via the vehicle-mounted charger, wherein the first predetermined charging time (Tx) and the second predetermined charging time (Ty) are preset for each charging cycle of a charging process of the power battery, and the first predetermined discharging time (Tm) and the second predetermined discharging time (Tn) are preset for each discharging cycle of a discharging process of the power battery.

2. The method according to claim 1, wherein selecting the manner for controlling the H bridge according to the relation between the first total working time ($T_{total1}$) and the second total working time ($T_{total2}$) comprises:
    selecting the manner from the first manner and the second manner for controlling the H bridge according to the relation between the first total working time ($T_{total1}$) and the second total working time ($T_{total2}$); and
    controlling the H bridge in the selected manner, until the first total working time ($T_{total1}$) is equal to the second total working time ($T_{total2}$).

3. The method according to claim 2, wherein selecting the manner from the first manner and the second manner for controlling the H bridge according to the relation between the first total working time ($T_{total1}$) and the second total working time ($T_{total2}$) comprises:
    selecting the second manner for controlling the H bridge if the first total working time ($T_{total1}$) is larger than the second total working time ($T_{total2}$);
    selecting the first manner for controlling the H bridge if the first total working time ($T_{total1}$) is smaller than the second total working time ($T_{total2}$); and
    selecting the first manner or the second manner for controlling the H bridge if the first total working time ($T_{total1}$) is equal to the second total working time ($T_{total2}$).

4. The method according to claim 3, wherein, if the H bridge is controlled in the first manner,
    when a power grid transient voltage value supplied to the vehicle-mounted charger is larger than 0 or an outwardly discharging transient voltage value of the vehicle-mounted charger is larger than 0, the first switch transistor is controlled to be ON, the second switch transistor is controlled to be OFF, and the third switch transistor and the fourth switch transistor are controlled to be ON and OFF alternately and complementarily; and
    when the power grid transient voltage value supplied to the vehicle-mounted charger is smaller than 0 or the outwardly discharging transient voltage value of the vehicle-mounted charger is smaller than 0, the third switch transistor is controlled to be ON, the fourth switch transistor is controlled to be OFF, and the first switch transistor and the second switch transistor are controlled to be ON and OFF alternately and complementarily.

5. The method according to claim 3, wherein, if the H bridge is controlled in the second manner,
    when a power grid transient voltage value supplied to the vehicle-mounted charger is larger than 0 or an outwardly discharging transient voltage value of the vehicle-mounted charger is larger than 0, the second switch transistor is controlled to be ON, the first switch transistor is controlled to be OFF, and the third switch transistor and the fourth switch transistor are controlled to be ON and OFF alternately and complementarily; and
    when the power grid transient voltage value supplied to the vehicle-mounted charger is smaller than 0 or the outwardly discharging transient voltage value of the vehicle-mounted charger is smaller than 0, the fourth switch transistor is controlled to be ON, the third switch transistor is controlled to be OFF, and the first switch transistor and the second switch transistor are controlled to be ON and OFF alternately and complementarily.

6. The method according to claim 5, wherein performing the alternate control on the H bridge according to the first predetermined charging time (Tx) and the second predetermined charging time (Ty) comprises:
    controlling the H bridge in the first manner until a time of controlling the H bridge in the first manner reaches the first predetermined charging time (Tx) and controlling the H bridge in the second manner until a time of controlling the H bridge in the second manner reaches the second predetermined charging time (Ty); or
    controlling the H bridge in the second manner until a time of controlling the H bridge in the second manner reaches the second predetermined charging time (Ty) and controlling the H bridge in the first manner until a time of controlling the H bridge in the first manner reaches the first predetermined charging time (Tx).

7. The method according to claim 6, wherein the first predetermined charging time (Tx) is equal to the second predetermined charging time (Ty).

8. The method according to claim 5, wherein performing the alternate control on the H bridge according to the first predetermined discharging time (Tm) and the second predetermined discharging time (Tn) comprises:
    controlling the H bridge in the first manner until a time of controlling the H bridge in the first manner reaches the first predetermined discharging time (Tm) and controlling the H bridge in the second manner until a time of controlling the H bridge in the second manner reaches the second predetermined discharging time (Tn); or
    controlling the H bridge in the second manner until a time of controlling the H bridge in the second manner reaches the second predetermined discharging time (Tn) and controlling the H bridge in the first manner until a time of controlling the H bridge in the first manner reaches the first predetermined discharging time (Tm).

9. The method according to claim 8, wherein the first predetermined discharging time (Tm) is equal to the second predetermined discharging time (Tn).

10. A vehicle-mounted charger of an electric vehicle, comprising:
    an H bridge, comprising a first switch transistor, a second switch transistor, a third switch transistor and a fourth switch transistor; and
    a controller, configured to obtain a first total charging time (TA) for controlling the H bridge in a first manner, a second total charging time (TB) for controlling the H bridge in a second manner, a first total discharging time (TC) for controlling the H bridge in the first manner and a second total discharging time (TD) for controlling the H bridge in the second manner; to calculate a first total working time ($T_{total1}$) of the H bridge in the first manner according to the first total charging time (TA) and the first total discharging time (TC) and to calculate a second total working time ($T_{total2}$) of the H bridge in the second manner according to the second total charging time (TB) and the second total discharging time (TD); to obtain a first predetermined charging time (Tx) for controlling the H bridge in the first manner, a second predetermined charging time (Ty) for controlling the H bridge in the second manner, a first predetermined discharging time (Tm) for controlling the H bridge in the first manner and a second predetermined discharging time (Tn) for controlling the H bridge in the second manner; to select a manner for controlling the H bridge according to a relation between the first total working time ($T_{total1}$) and the second total working time ($T_{total2}$); and to perform an alternate control on the H bridge according to the first predetermined charging time (Tx) and the second predetermined charging time (Ty) if the vehicle-mounted charger charges the power battery or according to the first predetermined discharging time (Tm) and the second predetermined discharging time (Tn) if the power battery discharges via the vehicle-mounted charger, wherein the first predetermined charging time (Tx) and the second predetermined charging time (Ty) are preset for each charging cycle of a charging process of the power battery, and the first predetermined discharging time (Tm) and the second predetermined discharging time (Tn) are preset for each discharging cycle of a discharging process of the power battery.

11. The vehicle-mounted charger according to claim 10, wherein the controller is further configured to:
select the manner from the first manner and the second manner for controlling the H bridge according to the relation between the first total working time ($T_{total1}$) and the second total working time ($T_{total2}$); and
control the H bridge in the selected manner, until the first total working time ($T_{total1}$) is equal to the second total working time ($T_{total2}$).

12. The vehicle-mounted charger according to claim 11, wherein the controller is further configured to:
select the second manner for controlling the H bridge if the first total working time ($T_{total1}$) is larger than the second total working time ($T_{total2}$);
select the first manner for controlling the H bridge if the first total working time ($T_{total1}$) is smaller than the second total working time ($T_{total2}$); and
select the first manner or the second manner for controlling the H bridge if the first total working time ($T_{total1}$) is equal to the second total working time ($T_{total2}$).

13. The vehicle-mounted charger according to claim 12, wherein, if the H bridge is controlled in the first manner, the controller is further configured to:
control the first switch transistor to be ON, the second switch transistor to be OFF, and the third switch transistor and the fourth switch transistor to be ON and OFF alternately and complementarily when a power grid transient voltage value supplied to the vehicle-mounted charger is larger than 0 or an outwardly discharging transient voltage value of the vehicle-mounted charger is larger than 0; and
control the third switch transistor to be ON, the fourth switch transistor to be OFF, and the first switch transistor and the second switch transistor to be ON and OFF alternately and complementarily when the power grid transient voltage value supplied to the vehicle-mounted charger is smaller than 0 or the outwardly discharging transient voltage value of the vehicle-mounted charger is smaller than 0.

14. The vehicle-mounted charger according to claim 12, wherein, if the H bridge is controlled in the second manner, the controller is further configured to:
control the second switch transistor to be ON, the first switch transistor to be OFF, and the third switch transistor and the fourth switch transistor to be ON and OFF alternately and complementarily when a power grid transient voltage value supplied to the vehicle-mounted charger is larger than 0 or an outwardly discharging transient voltage value of the vehicle-mounted charger is larger than 0; and
control the fourth switch transistor to be ON, the third switch transistor to be OFF, and the first switch transistor and the second switch transistor to be ON and OFF alternately and complementarily when the power grid transient voltage value supplied to the vehicle-mounted charger is smaller than 0 or the outwardly discharging transient voltage value of the vehicle-mounted charger is smaller than 0.

15. The vehicle-mounted charger according to claim 14, wherein the controller is further configured to:
control the H bridge in the first manner until a time of controlling the H bridge in the first manner reaches the first predetermined charging time (Tx) and control the H bridge in the second manner until a time of controlling the H bridge in the second manner reaches the second predetermined charging time (Ty); or
control the H bridge in the second manner until a time of controlling the H bridge in the second manner reaches the second predetermined charging time (Ty) and control the H bridge in the first manner until a time of controlling the H bridge in the first manner reaches the first predetermined charging time (Tx).

16. The vehicle-mounted charger according to claim 15, wherein the first predetermined charging time (Tx) is equal to the second predetermined charging time (Ty).

17. The vehicle-mounted charger according to claim 14, wherein the controller is further configured to:
control the H bridge in the first manner until a time of controlling the H bridge in the first manner reaches the first predetermined discharging time (Tm) and control the H bridge in the second manner until a time of controlling the H bridge in the second manner reaches the second predetermined discharging time (Tn); or
control the H bridge in the second manner until a time of controlling the H bridge in the second manner reaches the second predetermined discharging time (Tn) and control the H bridge in the first manner until a time of controlling the H bridge in the first manner reaches the first predetermined discharging time (Tm).

18. The vehicle-mounted charger according to claim 17, wherein the first predetermined discharging time (Tm) is equal to the second predetermined discharging time (Tn).

19. The vehicle-mounted charger according to claim 18, wherein the first switch transistor, the second switch transistor, the third switch transistor and the fourth switch transistor are Insulated Gate Bipolar Translators (IGBTs) or Metal Oxide Semiconductors (MOSes).

20. An electric vehicle, comprising:
a vehicle-mounted charger, comprising:
an H bridge, comprising a first switch transistor, a second switch transistor, a third switch transistor and a fourth switch transistor; and
a controller, configured to obtain a first total charging time (TA) for controlling the H bridge in a first manner, a second total charging time (TB) for controlling the H bridge in a second manner, a first total discharging time (TC) for controlling the H bridge in the first manner and a second total discharging time (TD) for controlling the H bridge in the second manner; to calculate a first total working time ($T_{total1}$) of the H bridge in the first manner according to the first total charging time (TA) and the first total discharging time (TC) and to calculate a second total working time ($T_{total2}$) of the H bridge in the second manner according to the second total charging time (TB) and the second total discharging time (TD); to obtain a first predetermined charging time (Tx) for controlling the H bridge in the first manner, a second predetermined charging time (Ty) for controlling the H bridge in the second manner, a first predetermined discharging time (Tm) for controlling the H bridge in the first manner and a second predetermined discharging time (Tn) for controlling the H bridge in the second manner; to select a manner for controlling the H bridge according to a relation between the first total working time ($T_{total1}$) and the second total working time ($T_{total2}$); and to perform an alternate control on the H bridge according to the first predetermined charging time (Tx) and the second predetermined charging time (Ty) if the vehicle-mounted charger charges the power battery or according to the first predetermined discharging time (Tm) and the second predetermined discharging time (Tn) if the power battery discharges via the vehicle-mounted charger, wherein the first predetermined charging time (Tx) and the second predetermined charging time (Ty) are preset for each charging cycle of a charging process of the power battery, and the first predetermined discharging time (Tm) and the second predetermined discharging time (Tn) are preset for each discharging cycle of a discharging process of the power battery.

\* \* \* \* \*